(12) United States Patent
Friggstad

(10) Patent No.: US 6,336,511 B1
(45) Date of Patent: Jan. 8, 2002

(54) TILLAGE IMPLEMENT WITH AUTOMATIC TRANSPORT LOCK RELEASE

(75) Inventor: Terrance A. Friggstad, Saskatchewan (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/737,798

(22) Filed: Dec. 18, 2000

Related U.S. Application Data

(62) Division of application No. 09/348,995, filed on Mar. 12, 1998, now Pat. No. 6,209,657.

(51) Int. Cl.[7] .............................................. A01B 63/32
(52) U.S. Cl. ...................... 172/311; 172/322; 172/456; 172/411; 172/662; 172/683
(58) Field of Search .............................. 172/311, 456, 172/481, 662, 683, 322; 111/57

(56) References Cited

U.S. PATENT DOCUMENTS

| | | | |
|---|---|---|---|
| 2,882,979 A | 4/1959 | Chandler et al. | 172/225 |
| 3,106,254 A | 10/1963 | Clark | 172/474 |
| 3,333,645 A | 8/1967 | Gustafson | |
| 4,137,852 A | * 2/1979 | Pratt | 172/311 X |
| 4,650,006 A | 3/1987 | Reimann | 172/443 |
| 4,821,809 A | 4/1989 | Summach et al. | 172/179 |
| 5,143,160 A | 9/1992 | May | 172/478 |
| 5,524,712 A | 6/1996 | Balmer | 172/311 |
| 5,641,026 A | 6/1997 | Balmer | 172/452 |
| 6,192,994 B1 | 2/2001 | Friggstad et al. | 172/311 |

FOREIGN PATENT DOCUMENTS

| | | | |
|---|---|---|---|
| AU | 10171/66 | 2/1967 | |
| CA | 1087903 | 10/1980 | |
| GB | 908625 | 10/1962 | |
| GB | 1037884 | 8/1966 | |
| IT | 456977 | 4/1950 | |

* cited by examiner

*Primary Examiner*—Christopher J. Novosad
(74) *Attorney, Agent, or Firm*—Larry W. Miller; John William Stader

(57) ABSTRACT

A forwardly folding tillage implement carries a number of ground engaging tools on a tool gang frame disposed to the rear of a carrier frame. A rockshaft is disposed between the carrier frame and the tool gang frame and is movable between four rotated positions about two axes of rotation. A control mechanism controls the relative angular position of the rockshaft. A support mechanism is disposed rearwardly of the axes of rotation to support the rear of the tool gang frame above the ground in the field working position. An abutment member restrains the relative rotation between the rockshaft and the tool gang frame to fully support the tool gang frame on the rockshaft upon rotation of the rockshaft. An automatic locking mechanism is associated with a transport latching apparatus to effect a release of the latching mechanism in response to the actuation of the hydraulic cylinders for converting the wing members from the transport configuration to the field operating configuration. The automatic locking mechanism includes a pivoted trip member connected to the hydraulic cylinder and movable between a pair of fixed stops, a pivoted latch keeper associated with the latch hook of the transport lock, and a connecting link interconnecting the trip member and the latch keeper to transfer pivotal movement from said trip member to control the operation of the latch keeper.

13 Claims, 28 Drawing Sheets

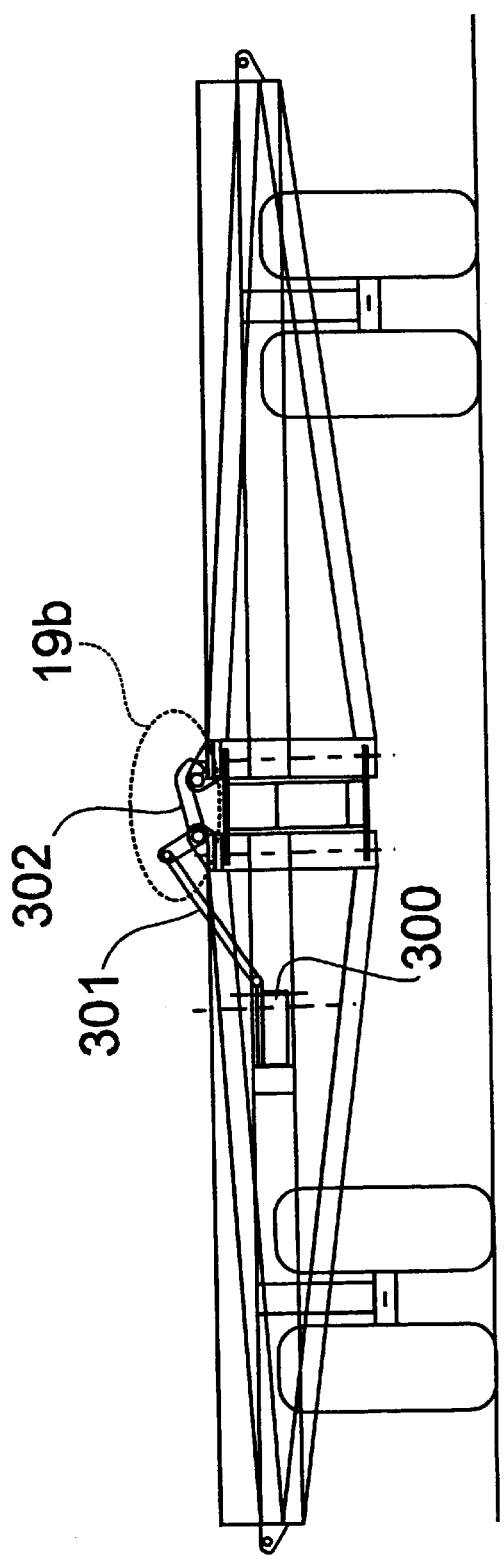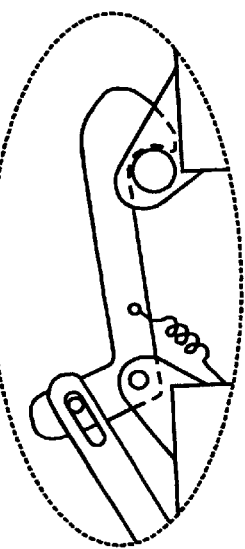
Fig. 19a
Fig. 19b

Fig. 23a
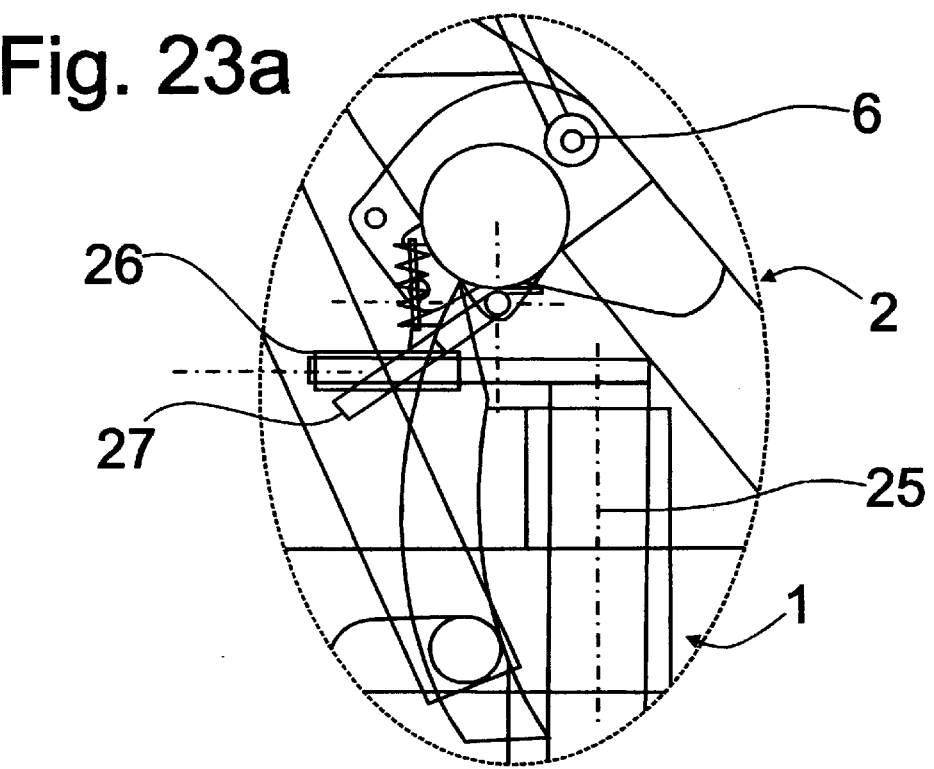
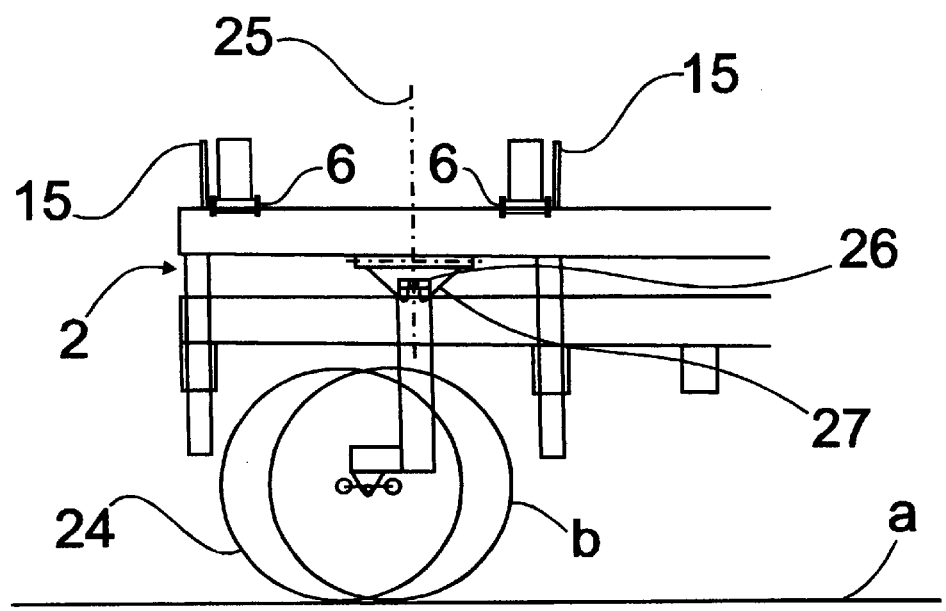
Fig. 23b

TILLAGE IMPLEMENT WITH AUTOMATIC TRANSPORT LOCK RELEASE

CROSS REFERENCE TO RELATED APPLICATIONS

This application is a divisional of U.S. application Ser. No. 09/348,995, filed on Mar. 12, 1998, now U.S. Pat. No. 6,209,657.

BACKGROUND OF THE INVENTION

Modern farmers strive to improve the management of increasing amounts of farm acres. Improving management requires farmers to be able to quickly prepare the soil for each season's farming operations. This haste has driven the need for more efficient and larger farming equipment.

Implements such as harrows, packers, or combined harrow-packers were some of the earliest implements to be made with widths exceeding sixty feet in the field operating position. As tractor horsepower has increased over time, larger tillage implements have been made available. These larger implements require a mechanism for compactly folding the implement for practical and safe transport over the highway. U.S. Pat. No. 4,821,809, patented by Summach et al., discloses a convenient mechanism for such folding.

The conventional method of folding tillage implements is by folding wing sections along forward aligned axes such that the wings are folded to a generally upright position. Double folding wing sections may have outer sections that fold inwardly and downwardly from the ends of inner wing sections in five section winged implements. In the case of these conventional wing implements, the minimum implement width that can be achieved by such folding is limited by the width of the center section. As a result, road transport may still be somewhat restricted as these implements often exceed twenty feet or more in transport width.

Road transport standards in North America are beginning to follow the standards set in Europe in which maximum road transport widths and heights for agricultural implements are being defined. Large implements that have conventional folding wing sections are not able to be folded such that they fall within width and height limits that may be generally 3 meters wide and 4 meters high. Some U.S. states have adopted transport width limits of 13.5 ft.

Forward or rear folding implements provide some relief with respect to such transport limits. However, implements must also be made to function with the accurate seeding ability that conventionally folded implements have become capable of. Although some rear or forward folding multibar tillage implements have been developed, they do not demonstrate the accurate depth control required for farming operations.

One problem is that a tillage-packer combination for drill seeding requires the gang supporting tillage elements to be maintained parallel to the ground through a range of adjustable operating levels. The drawbar disclosed in Summach '809 raises or lowers the first attached gang of elements in a rotatable manner through its field and transport ranges of motion. A level manner of height adjustment is required for tillage elements.

Another problem that must be overcome for compact folding is the avoidance of the packer elements of the second gang striking the tillage elements of the first gang when raised to the transport position. If compact folding is not required, then the downward rotation of the suspended second gang may be limited so as not to impact the elements of the first gang. But when compact folding is desired, the elements of the second gang are in direct alignment with the ground elements of the first gang so that alignment is achieved.

Therefore, a multibar implement is required for the tillage of high acre farms with both speed and efficiency.

SUMMARY OF THE INVENTION

It is an object of the invention to provide a compactly folding tillage implement that includes an automatic transport lock releasing mechanism. It is a feature of the invention that the transport lock releasing mechanism includes a connecting link that interconnects a pivoted trip member and a pivoted latch keeper to transfer pivot movement from the trip member to the latch keeper.

It is another feature of the invention that the initial actuation of the hydraulic cylinders effecting the conversion of the wing members from the transport configuration to the field operating configuration causes the transport lock to release automatically.

It is an advantage of the invention that the actuation of the hydraulic cylinders effecting the conversion of the wing members from the transport configuration to the field operating configuration causes the transport lock to release without input from the operator.

It is another object of the invention to provide a compact folding implement capable of being configured either as a multibar implement or as a single bar implement for row crop applications, thereby providing economy in manufacturing.

It is still another object of this invention to provide a compact folding implement capable of accurate seeding across its working width even while traversing uneven slopes.

An implement having a toolbar or frame to which a first tool gang is attached may also have a second tool gang attached to the rearward end of the first tool gang so both sets of gangs are drawn by the implement frame or toolbar for field operation. Such an implement avails itself for compact folding in which the first tool gang may be rotated to a general upright position and the second tool gang becomes suspended from the now upper end of the first gang. Such an implement is patented in U.S. Pat. No. 4,821,809 to Summach et al. According to the patent, the implement frame or toolbar may be folded for compact folded transport. This design works particularly well for harrow-packer combined implements.

One key advantage of this style of folding is that for a harrow-packer combined implement, the packers are pulled inward toward the implement frame substantially before they are lifted from the ground, which significantly reduces the torsion required of the toolbar or frame elements in order to produce sufficient lifting force to effect compact folding.

This invention provides an offset for the alignment of the second gang elements from the first gang ground elements so they do not impact when the implement is folded.

A spiral guide is provided on the pivotal connection on which the second implement gang is attached to the first implement gang. When the implement is folded to transport position, the spiral guide shifts the second gang out of alignment with the first gang so their elements do not impact.

These and other objects, features, and advantages are accomplished according to the present invention by providing a forwardly folding tillage implement that carries a number of ground engaging tools on a tool gang frame disposed to the rear of a carrier frame. A rockshaft is disposed between the carrier frame and the tool gang frame and is movable between four rotated positions about two axes of rotation. A control mechanism controls the relative angular position of the rockshaft. A support mechanism is disposed rearwardly of the axes of rotation to support the rear of the tool gang frame above the ground in the field working position. An abutment member restrains the relative rotation between the rockshaft and the tool gang frame to fully support the tool gang frame on the rockshaft upon rotation of the rockshaft. An automatic locking mechanism is associated with a transport latching apparatus to effect a release of the latching mechanism in response to the actuation of the hydraulic cylinders for converting the wing members from the transport configuration to the field operating configuration. The automatic locking mechanism includes a pivoted trip member connected to the hydraulic cylinder and movable between a pair of fixed stops, a pivoted latch keeper associated with the latch hook of the transport lock, and a connecting link interconnecting the trip member and the latch keeper to transfer pivotal movement from said trip member to control the operation of the latch keeper.

BRIEF DESCRIPTION OF THE DRAWINGS

FIG. 18a is an enlarged schematic detail plan view of a first joint in the autolock mechanism positioned on the carrier frame as identified by the arrow referring to FIG. 18.

FIG. 18b is an enlarged schematic detail plan view of a second joint in the autolock mechanism positioned on the carrier frame as identified by the arrow referred to in FIG. 18.

FIG. 19a is a partial schematic elevational view of the central portion of the carrier frame as an orthogonal projection of FIG. 19.

FIG. 19b is an enlarged schematic detail elevational view of a portion of the autolock mechanism positioned on the carrier frame as identified by the arrow referring to FIG. 19a.

FIG. 23a is a schematic enlarged detail view of the castor wheel lock shown in FIG. 23.

FIG. 23b is a schematic side elevational view of FIGS. 23 and 23a.

DETAILED DESCRIPTION OF THE PREFERRED EMBODIMENTS

Figure 1:
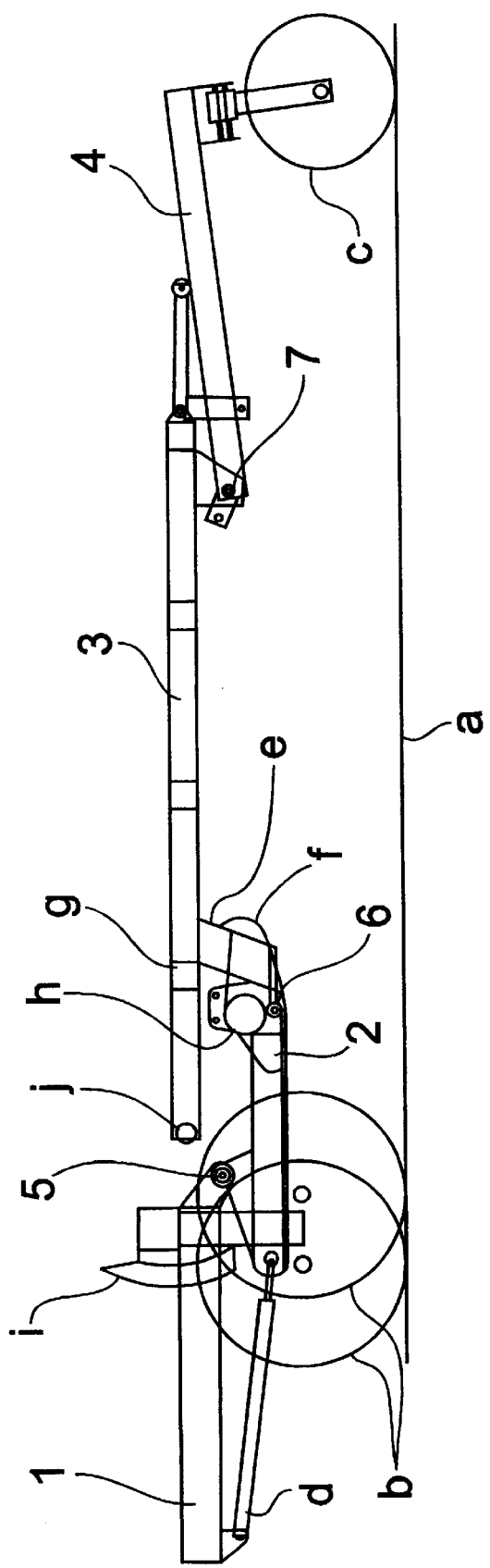
FIG. 1 is a schematic side elevational view of the preferred embodiment of the farm implement in a first position.

The preferred embodiment of the farm implement of the invention, as shown in FIG. 1, comprises an implement carrier frame 1 on which is pivotally attached a rockshaft 2 at first pivot 5. Wheels shown at b support the carrier frame above the ground. A tool gang frame 3 is also attached to the rockshaft 2 at second pivots 6. A ground engaging rear depth control arm 4 is attached to the rear of the tool gang 3 at pivots 7. FIG. 1 shows a side elevation of the implement in its lowermost or first position. Tool gang frame 3 is disposed parallel to the ground a and is freely rotatable about and supported front and back by first and second pivot axes 6 and 7 respectively.

A plurality of ground working tools may be mounted on the tool gang frame for working at variable depths generally parallel to the surface of the ground a. A rockshaft 2 is mounted to carrier frame 1 for rotation about pivot axis 5. The angular position of the rockshaft 2 is controlled by a hydraulic cylinder d shown fully retracted with the rockshaft 2 generally horizontal in FIG. 1. A flange 3 on tool gang frame 3 extends downward and provides pivotal support for tool gang frame 3 about axis 6. A tool support arm 4 is pivotally attached at pivot axis 7 to support tool gang frame 3 at the rear and may carry an additional soil working tool c.

Figure 2:
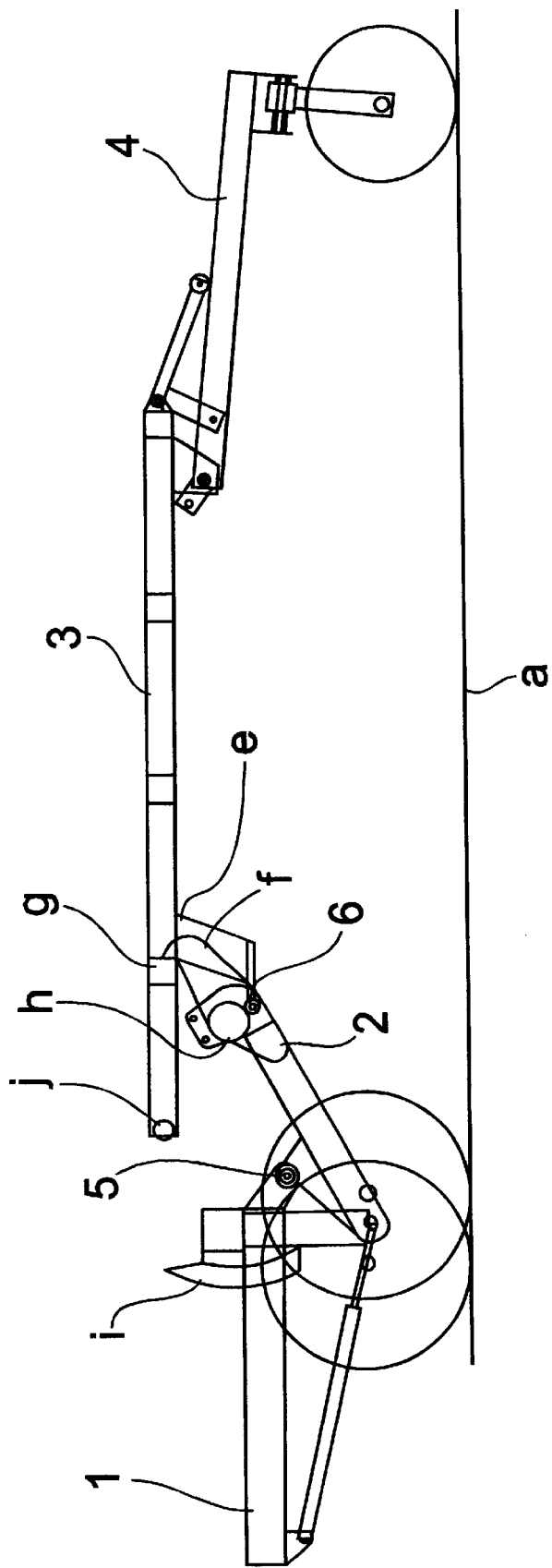
FIG. 2 is a schematic side elevational view of the preferred embodiment of the farm implement in a second position.

FIG. 2 shows a side elevation of the implement upon partial extension of the hydraulic cylinder d to a second position at which rotation of the tool gang frame 3 about pivot axis 6 ceases when abutment f contacts tool gang frame 3 at abutment point g. In the configuration shown in FIG. 1, the rear of tool gang frame 3 is supported by the control arm 4. At the second position shown in FIG. 2, the working tools may be elevated above the ground.

Figure 3:
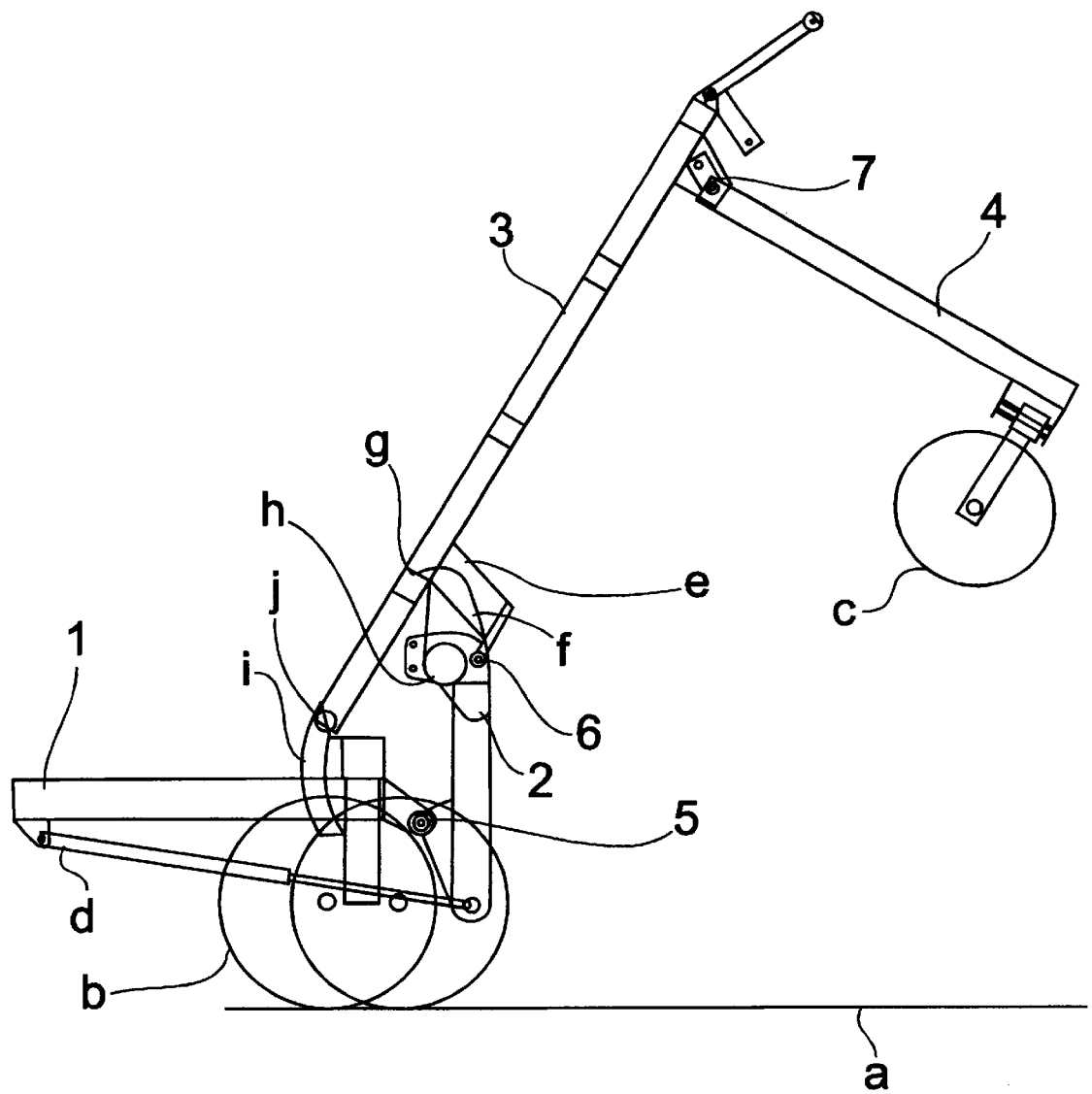
FIG. 3 is a schematic side elevational view of the preferred embodiment of the farm implement in a third position.

FIG. 3 shows a side elevation of the implement upon further extension of cylinder d to move the rockshaft to a third position. Between the second position shown in FIG. 2 and the third position shown in FIG. 3, rotation of the tool gang frame 3 about second pivot axis 6 is restrained. Additionally, frame 3 rotates in conjunction with rockshaft 2 about first pivot axis 5, is supported on rockshaft 2, and is free of the ground. At the third position as shown in FIG. 3, tool gang frame roller j contacts curved track I mounted on carrier frame 1.

Figure 4:
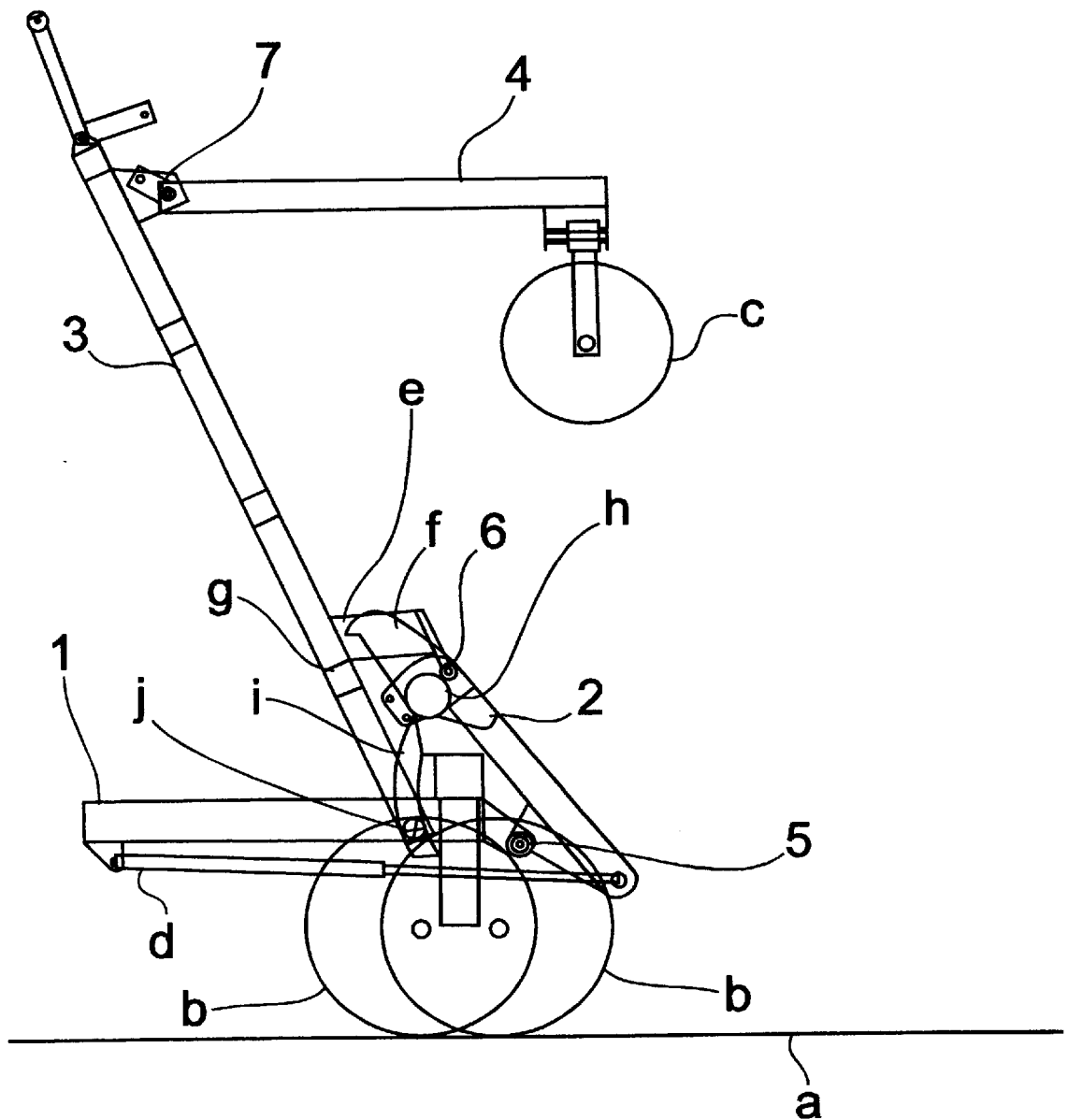
FIG. 4 is a schematic side elevational view of the preferred embodiment of the farm implement in a fourth position.

As shown in FIG. 4, further extension of cylinder d rotates rockshaft 2 about the first axis 5 to a fourth position. Between the third position and the fourth position, the roller j interacts with curved track i to continue rotation of the tool gang frame 3 about the second axis 6 and moves the abutment f out of contact with the abutment point g.

Figure 5:
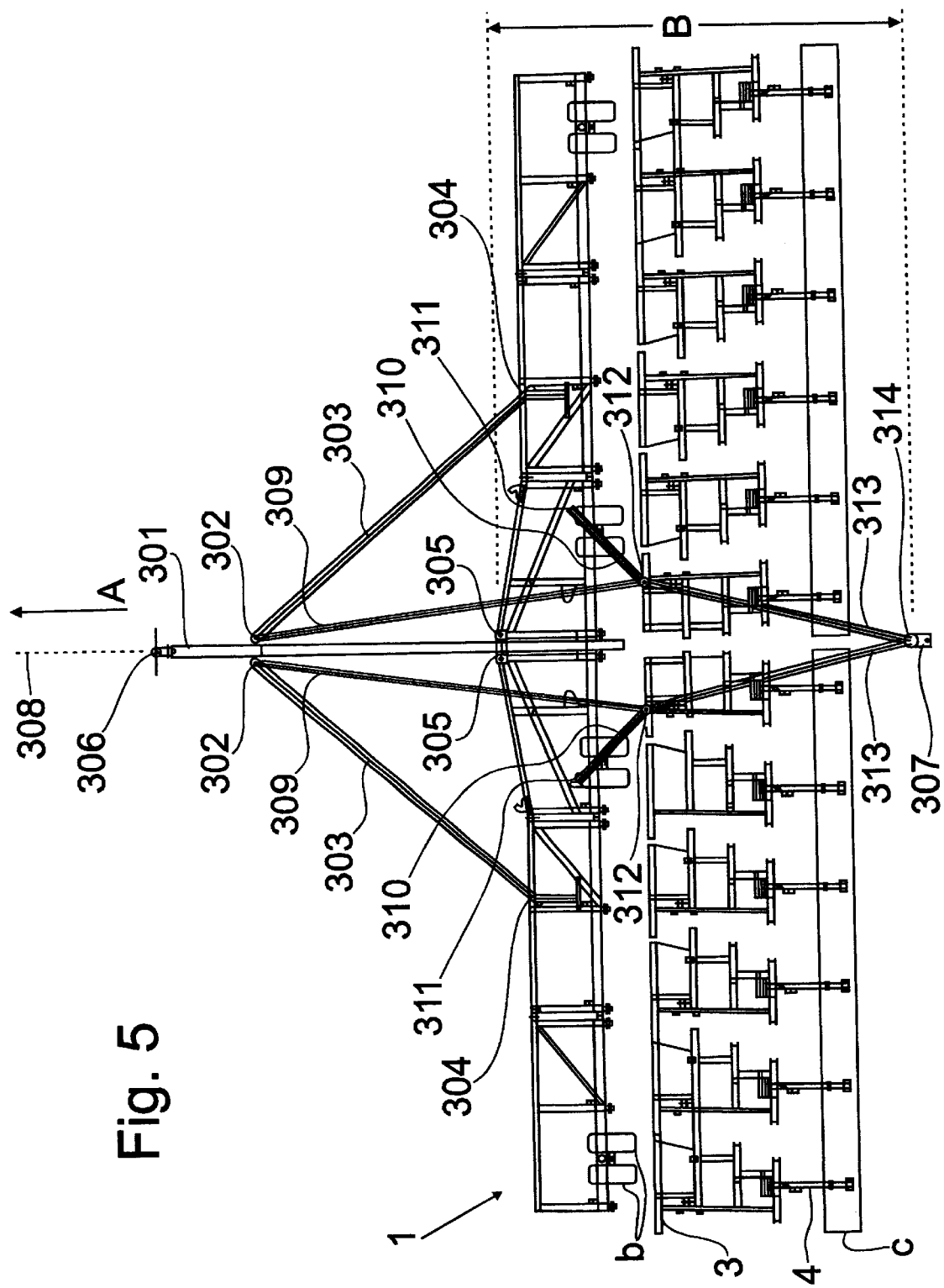
FIG. 5 is a schematic plan view of the preferred embodiment of the farm implement in its fully extended working position.

Referring now to FIG. 5, the carrier frame 1 is preferably arranged as a pair of wings symmetrical about the implement center line 308 for travel in direction A. Each of the 2 wings is pivotally attached to the central telescoping hitch 301 for motion about a vertical axis at 305. The carrier frame 1 is supported on transversely spaced pairs of wheels b. The rockshaft 2 shown in FIGS. 1–4 is not shown on FIGS. 5–6 for simplicity. A plurality of tool gang frames 3 and support arms 4 are shown. Support tools c are represented schematically. Draft arms 303 connect each wing section as at pivotal attachment 304 on frame 1 to telescoping hitch 301 at pivot point 302.

As can be seen in FIGS. 5, 5a, 5b, and 6, the carrier frame 1 is folded forward symmetrically by extension of telescoping hitch 301. The hitch 301 is extended in length in each successive figure. A pair of secondary draft or hitch members 309 is pivotally attached to hitch 301 at 302 and extends rearwardly towards secondary hitching point 307. Mounted between members 309 and hitch point 307 are rear hitch members 313 which are pivotally connected between pivot points 312 and 314 for rotation about vertical axes. Pivot points 312 are also connected to support arms 310 extending from each hitch member to a respective frame section for pivotal movement as at 311.

As can be seen in FIG. 5, a secondary hitch is provided to which another implement may be attached as at 307 for operation in the direction of travel A. The draft load of the second implement is supported on hitch members 309 and 313 along with support arms 310 which act to maintain hitch members 309 and 313 separated from the implement center line 308.

Figure 5A:
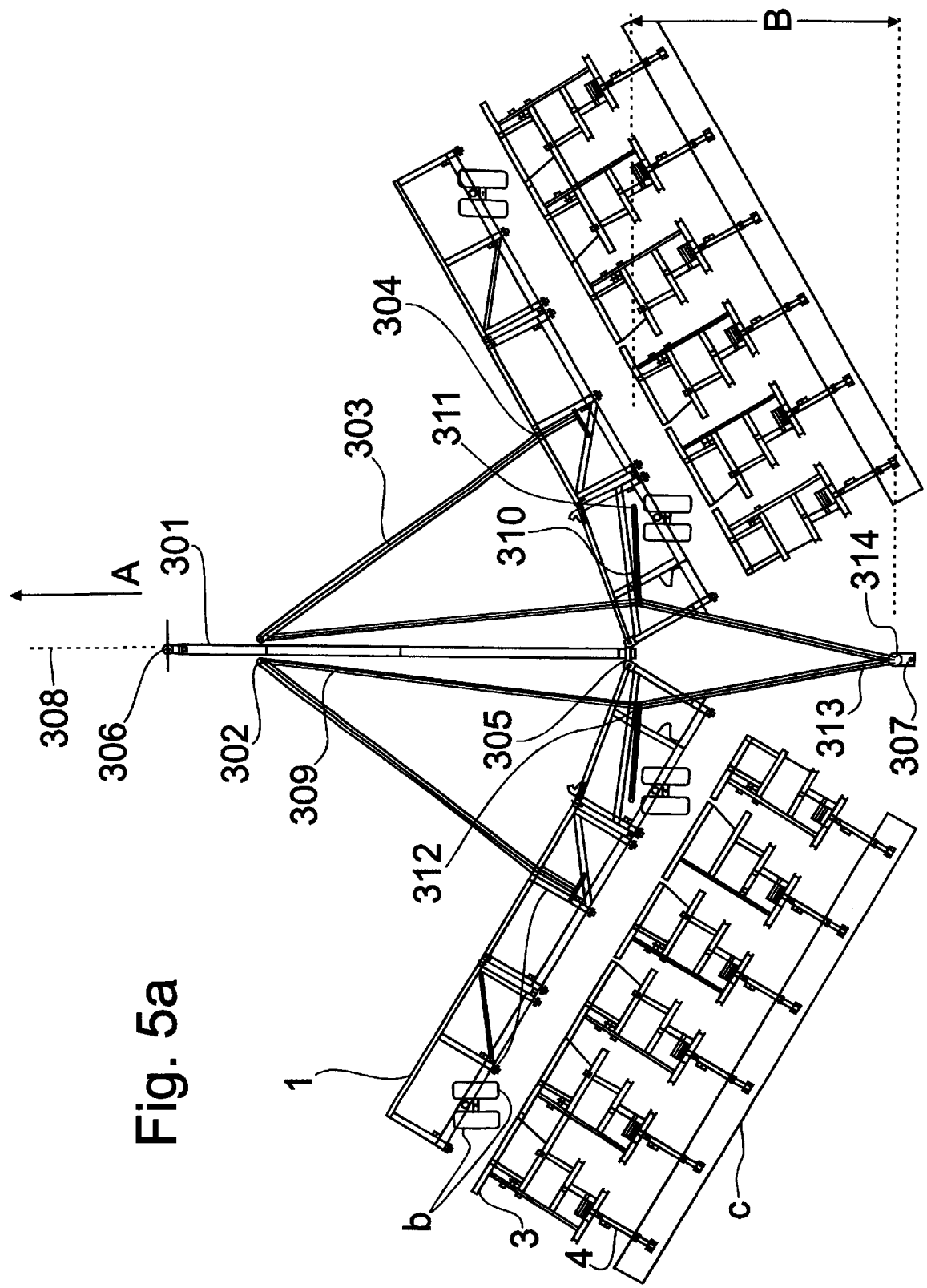
FIG. 5a is a schematic plan view of the preferred embodiment of the farm implement with its two wings partially folded forward.
Figure 5B:
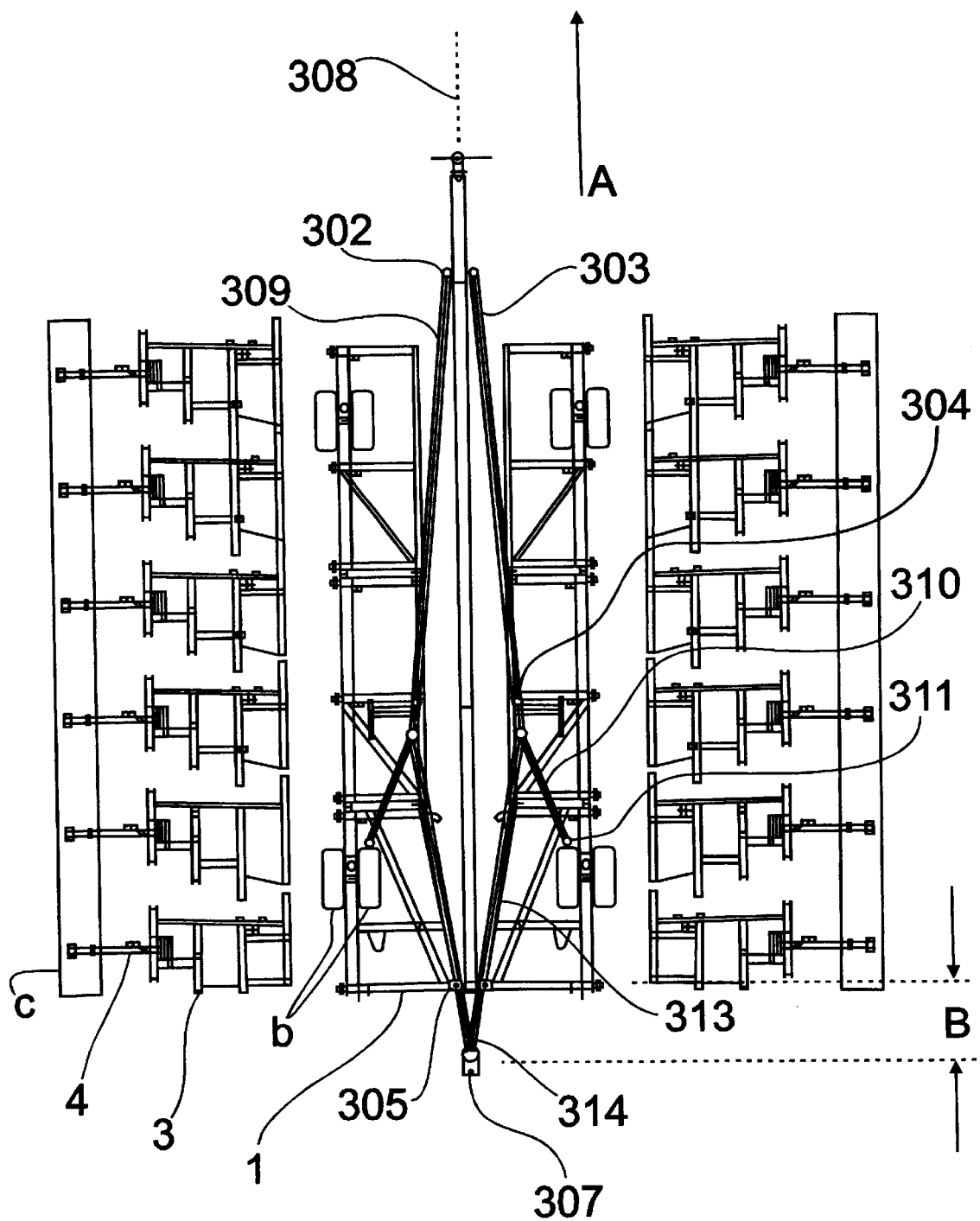
FIG. 5b is a schematic plan view of the preferred embodiment of the farm implement with its two wings fully folded forward.

As telescoping hitch 301 is extended and the wings are folded forward as shown in FIG. 5a, the distance B between pivots 305 and hitch point 307 is substantially shortened. As telescoping hitch 301 is further extended and the wings folded to the direction of travel A, the distance B is minimized, thereby bringing the second implement in close proximity to carrier frame 1 for stability in transport.

Figure 6:
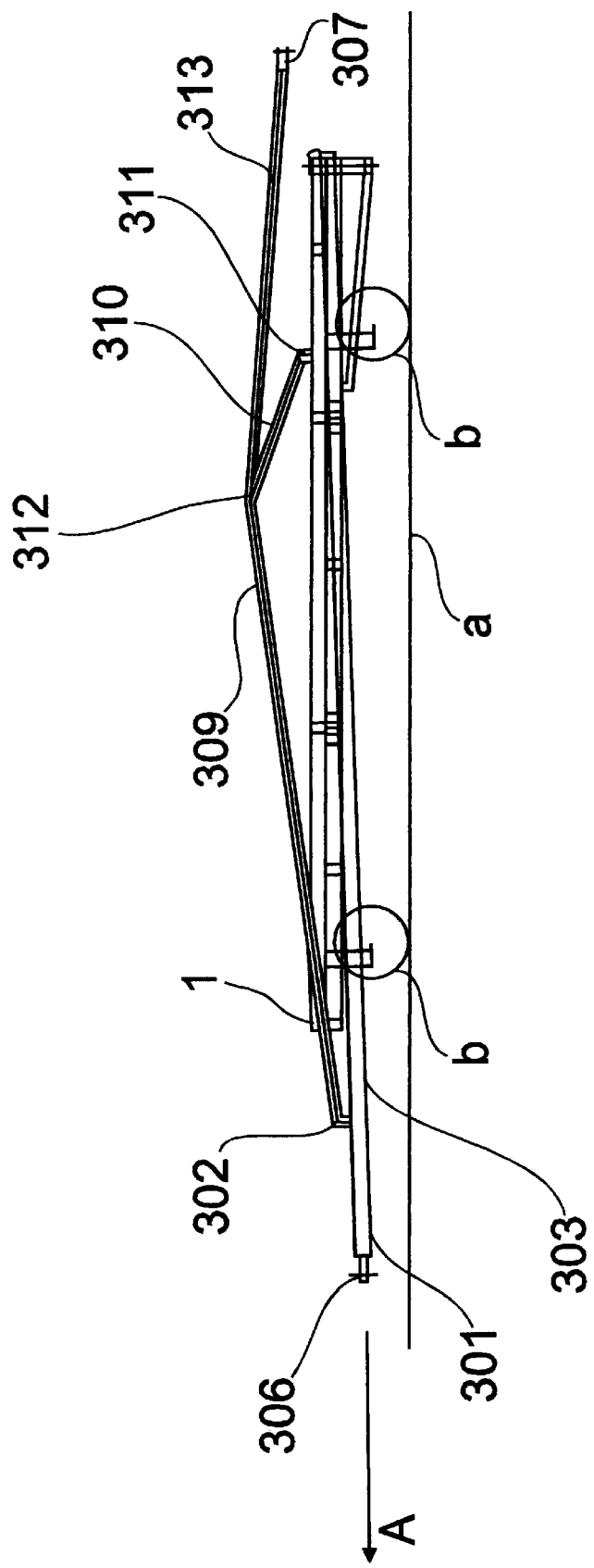
FIG. 6 is a schematic side elevational view of the preferred embodiment of the farm implement.
Figure 7:
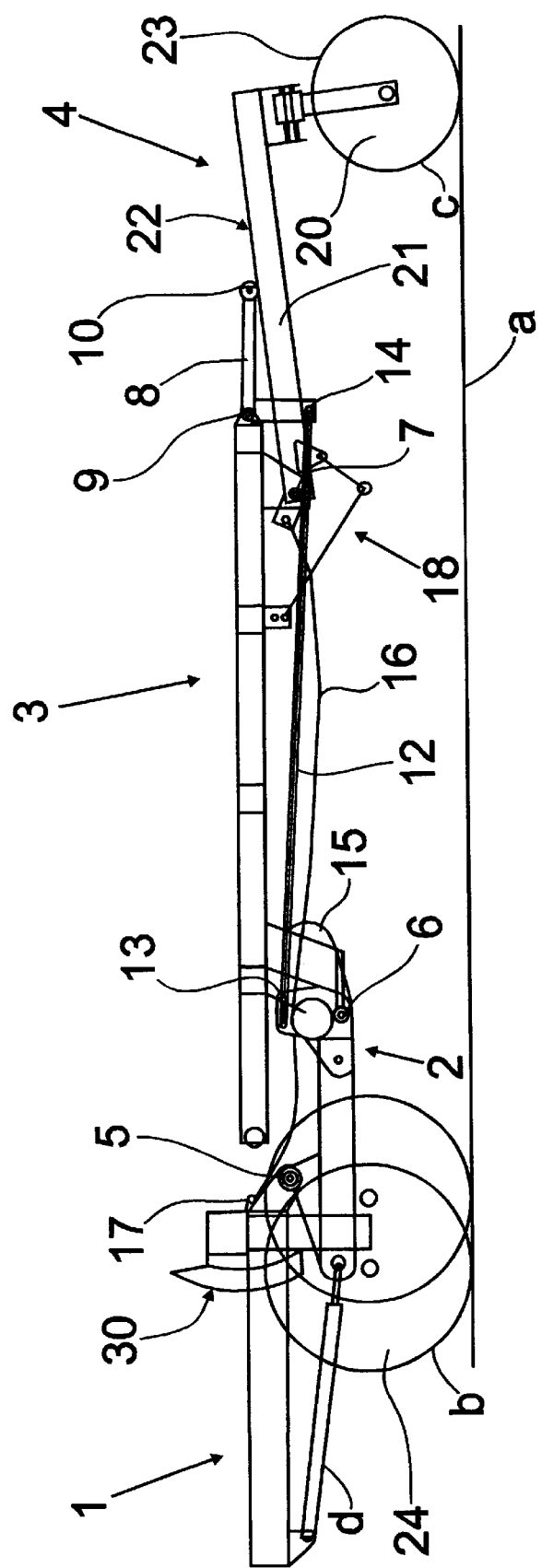
FIG. 7 is a schematic side elevational view of the preferred embodiment shown in FIG. 1 showing the depth control in more detail.
Figure 8:
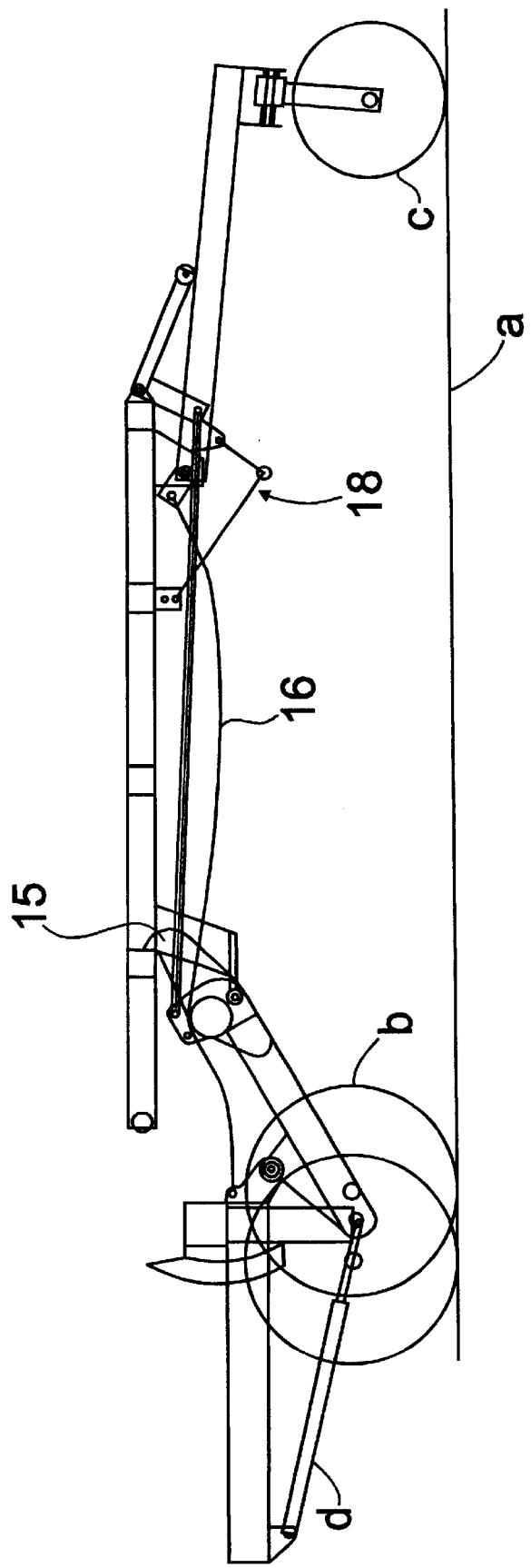
FIG. 8 corresponds to FIG. 2 and shows the depth control in the second rockshaft position.
Figure 9:
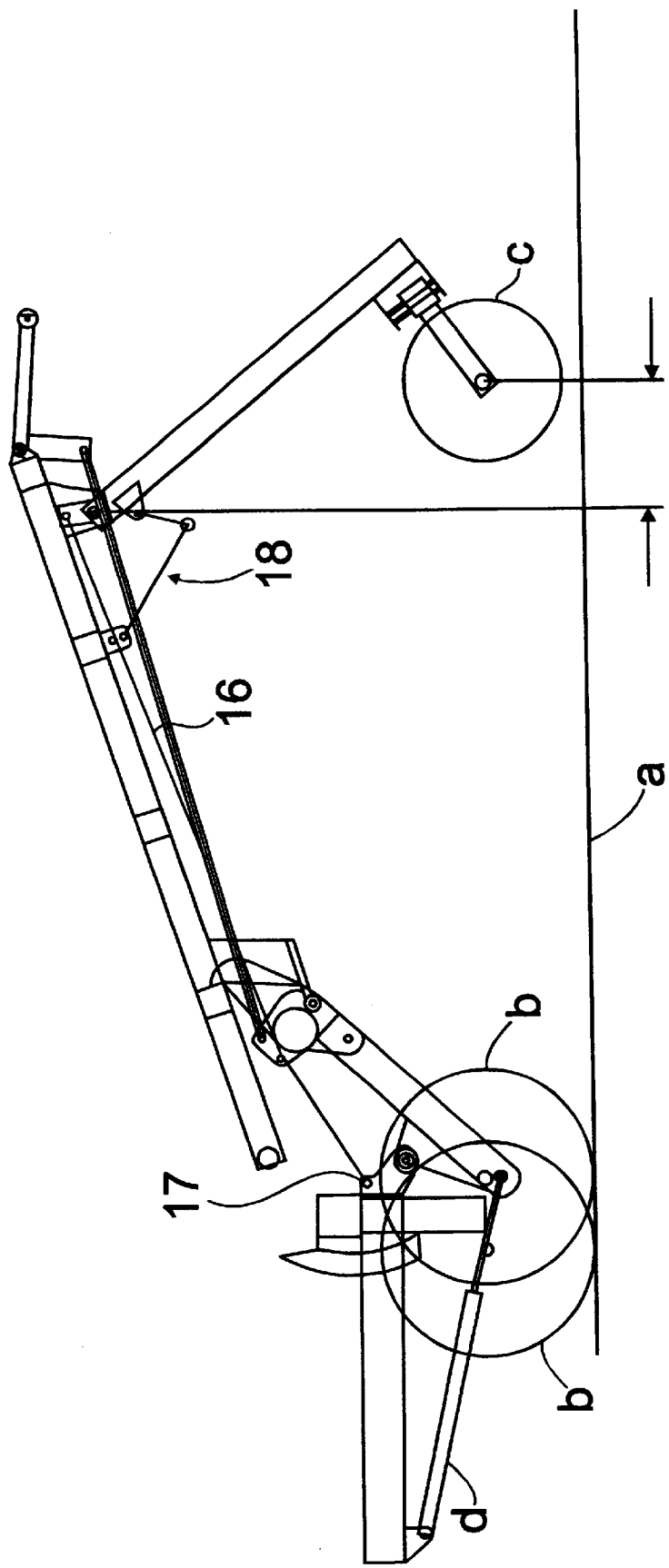
FIG. 9 is a schematic side elevational view depicting a rockshaft position intermediate the second and third rockshaft positions.
Figure 10:
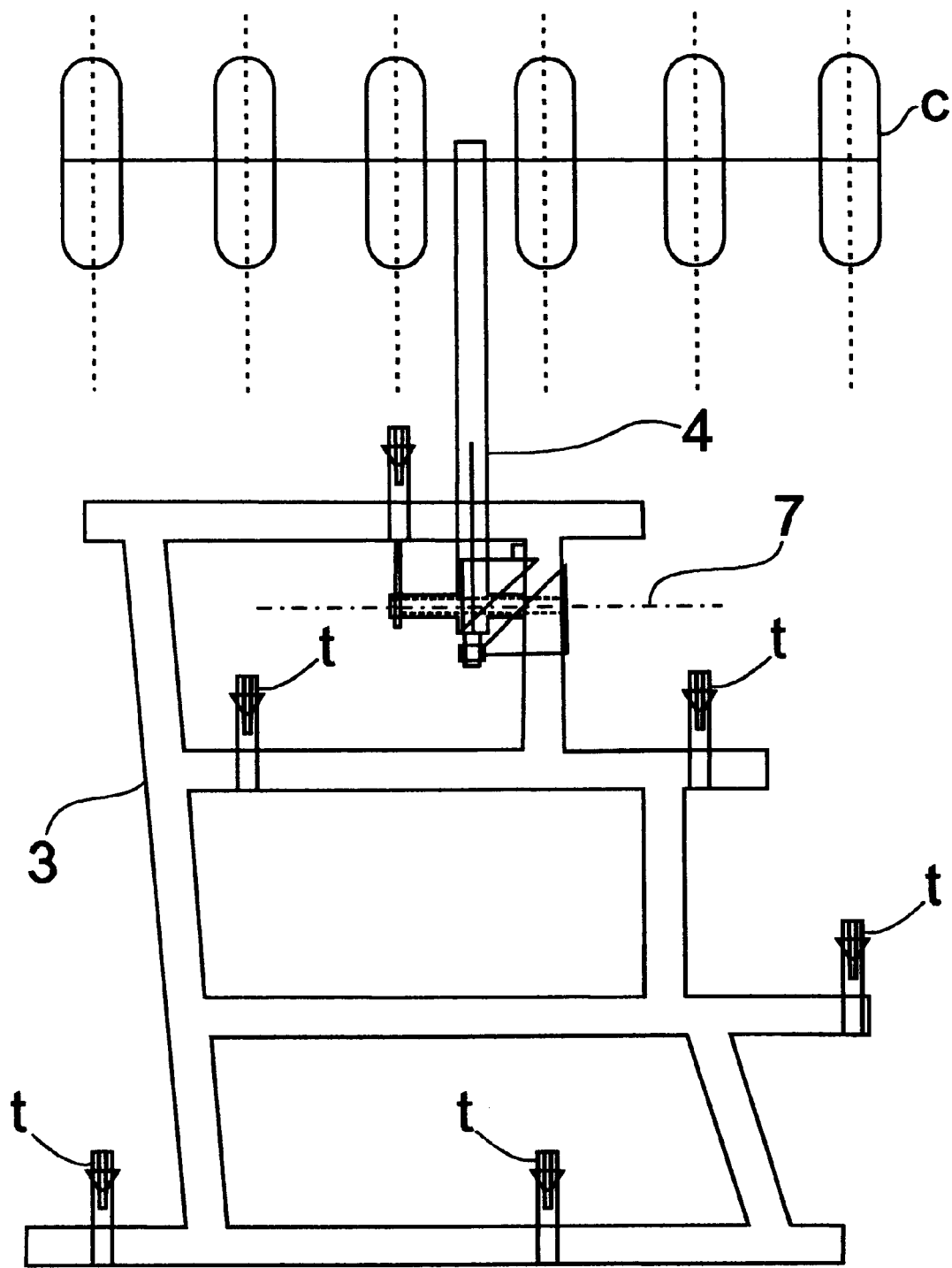
FIG. 10 is a schematic partial plan view of the tool gang frame of the preferred embodiment in the position corresponding to FIG. 1.
Figure 11:
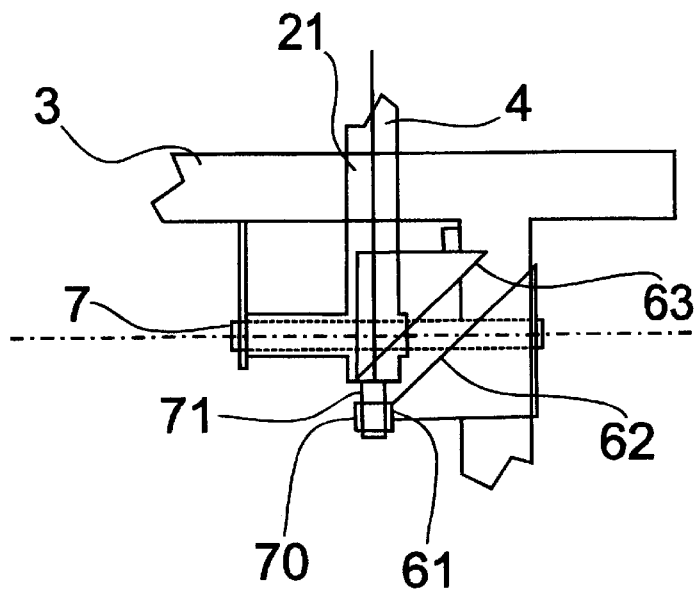
FIG. 11 is an enlarged schematic detail plan view of the spiral guide of the preferred embodiment in the position shown in FIG. 10.
Figure 12:
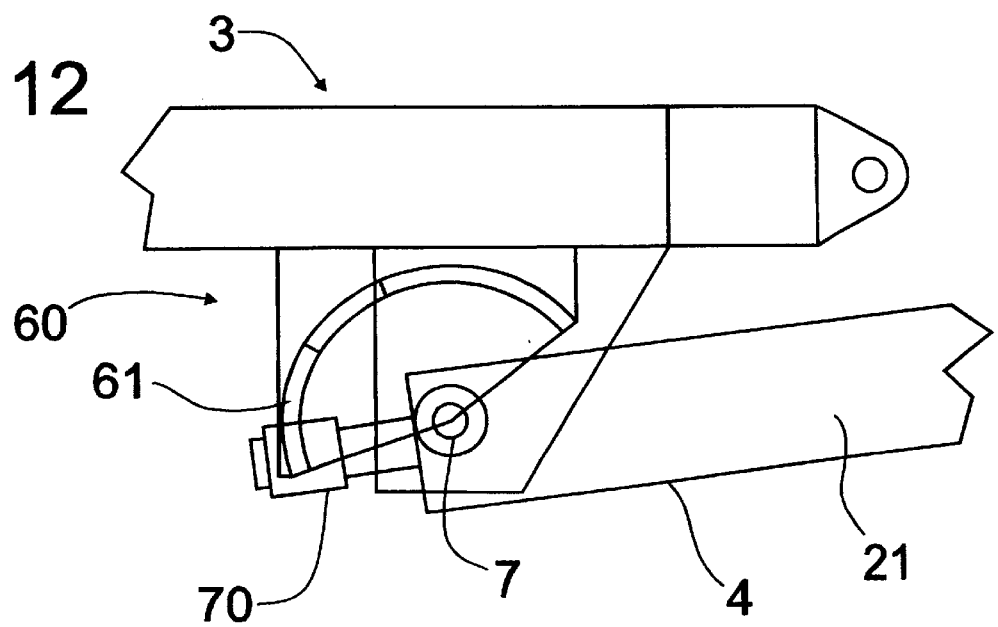
FIG. 12 is an enlarged schematic detail elevational view of the spiral guide of FIGS. 10 and 11.
Figure 14:
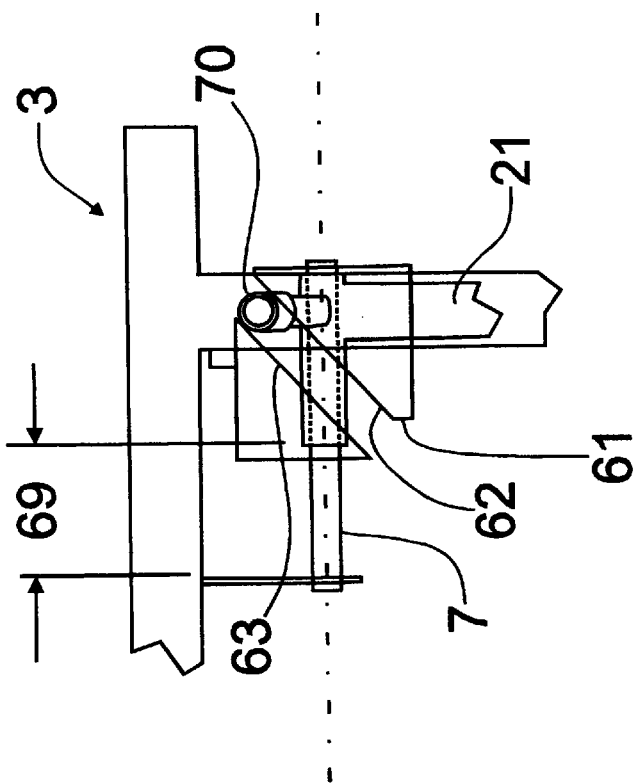
FIG. 14 is an enlarged schematic detail plan view of the spiral guide depicted in FIG. 13.
Figure 13:
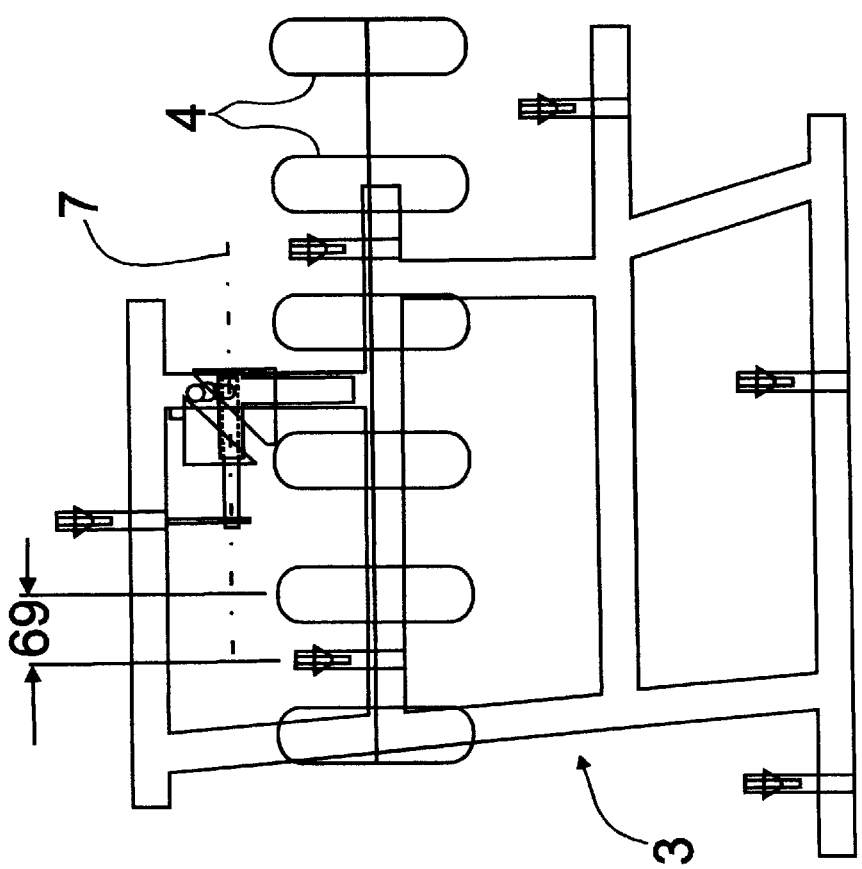
FIG. 13 is a schematic partial plan view of tool gang frame depicting the spiral guide of FIG. 10 in the third and fourth rockshaft positions.
Figure 15:
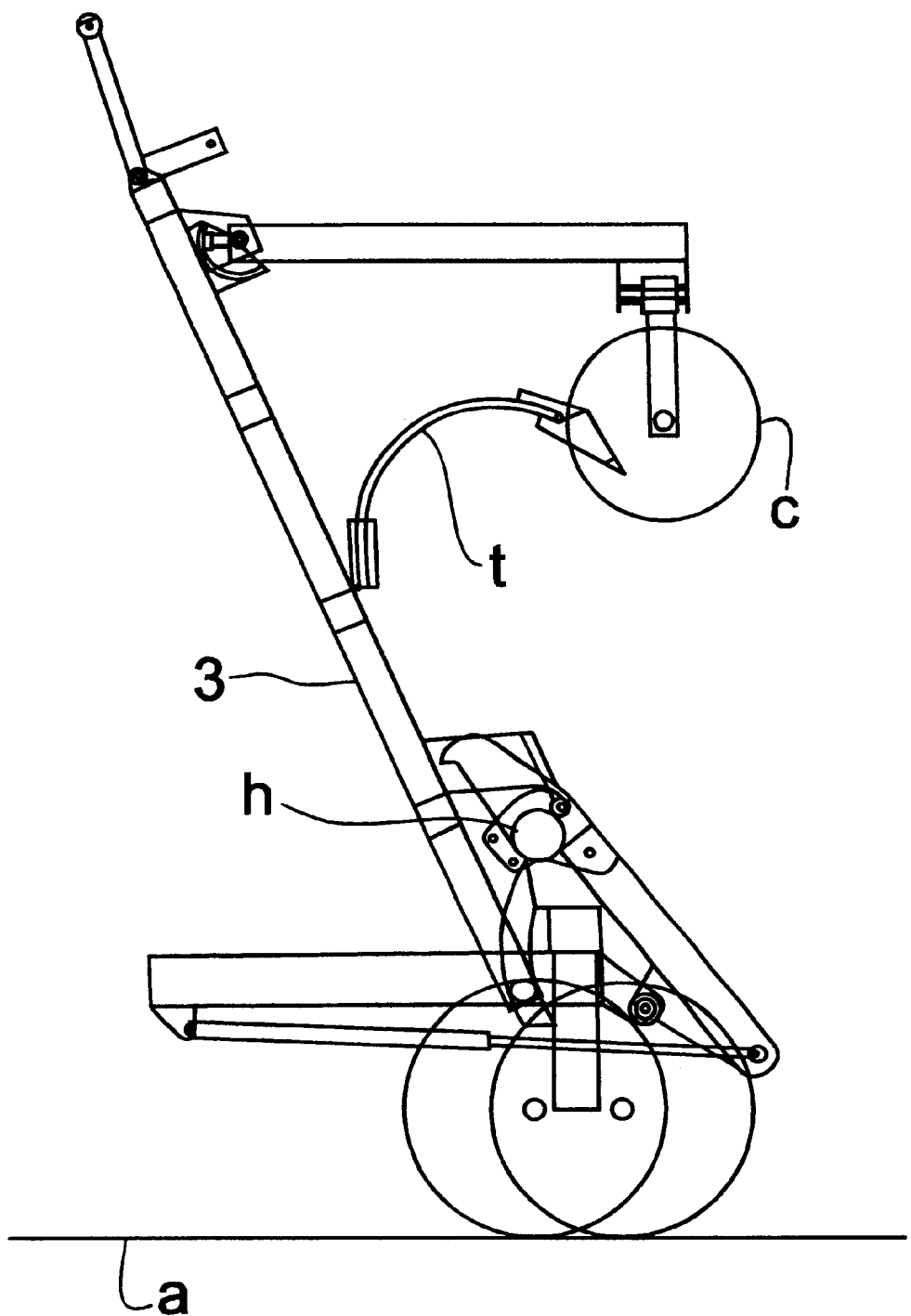
FIG. 15 is a schematic side elevational view of the tool gang frame depicted in FIGS. 13 and 14 including typical tool 5 raised to a transport position.

In FIG. 6, a schematic elevation of the preferred embodiment is shown in which the secondary hitch members 309, 310 and 313 are above carrier frame 1. Referring now to FIGS. 7 through 9, the preferred embodiment will be described in relation to depth adjustment. FIGS. 7 and 8 correspond generally to FIGS. 1 and 2, respectively. FIG. 9 is a side elevation intermediate the second and third rockshaft positions. At another point 13 on the rockshaft, offset from the tool gang pivot 6, a depth control link 12 is pivotally attached. The depth control link is attached at end 14 to a first end of a depth control lever 8. The lever is pivotally attached to the rear part of the tool gang frame 3 at an intermediate point between its ends. A roller 10 is attached to the lever's second end.

The implement depth control 4 consists of an arm 21 which is pivotally attached at one end 7 to a rear part of the tool gang frame 3 and has ground engaging wheels 23 pivotally attached at its other end having a generally transverse axis 20. In the field position, roller 10 is in contact with the upper surface 22 of the support arm 21 and the support arm thereby supports the rearward part of the tool gang frame. This in part controls the depth of the tool gang frame as the ground wheels follow the surface of the ground.

In field positions, the tool gang frame 3 may pivot on attachment pivot 6 as ground wheels 23 and ground wheels 24 follow the slope of the ground. The tool gang is supported parallel to the ground between the frame ground wheels and depth gage ground wheels. A screw connects the depth control link to the depth control lever. The screw may be utilized to adjust the effective length of the depth control link for leveling the tool gang frame. Each tool gang frame may thereby be independently leveled. Alternatively, a turnbuckle or similar length adjusting means may be used in the depth control link.

The rockshaft 2 of respective frame sections is rotated clockwise or counterclockwise as shown in the view in FIGS. 7 and 8 to respectively lower or raise the attached tool gang frame sections. The depth control link 12 is drawn forward relative to the tool gang frame 3 when the rockshaft is rotated counterclockwise to raise the tool gang frame. The depth control link causes the depth control lever 8 to rotate clockwise in the view of FIG. 8 and the roller on its second end bears down on the depth control support arm 4, thereby causing rotation of the depth control in a clockwise direction. The attachment points of the linkage on the rockshaft and on the depth control lever are such that the rear depth control is rotated an amount causing an equal rise at the rear of the tool gang when the rockshaft raises the front of the tool gang as shown in FIGS. 7 and 8.

The preferred embodiment will now be described in respect of its spiral guide in conjunction with FIGS. 10 through 14. The spiral guide 60 is made to have an axis generally concentric with the pivot 7 by which packer arm 21 is attached to tillage gang frame 3. The packer arm has a spindle 71 extending its pivotally connected end on which a roller 70 is secured. The spiral guide 60 has a non-spiral surface 61 which the roller 70 follows when the implement is in the field position, and which restricts the sideways movement of the packer arm on the pivot shaft 7, as shown in FIGS. 10–15. As the implement is folded to the transport position as shown in FIGS. 10–15, the roller 70 leaves the non-spiral surface 61 and follows the angled or spiral surface 62. The roller 70 is limited by opposing spiral surface 63. As the packer pivots downwardly from the end of the tool gang frame 3 or tillage gang, the roller is caught in a track formed between the spiral surfaces 62,63. The spiral shape is such that the controlled movement causes a sideways or lateral offset 69 of the packer elements as the packer is suspended and rotates downwardly when being raised to the transport position. The spiral surfaces 62,63 control the roller movement and cause the packer to return to alignment with the tillage elements when lowered into the field position.

Figure 16:
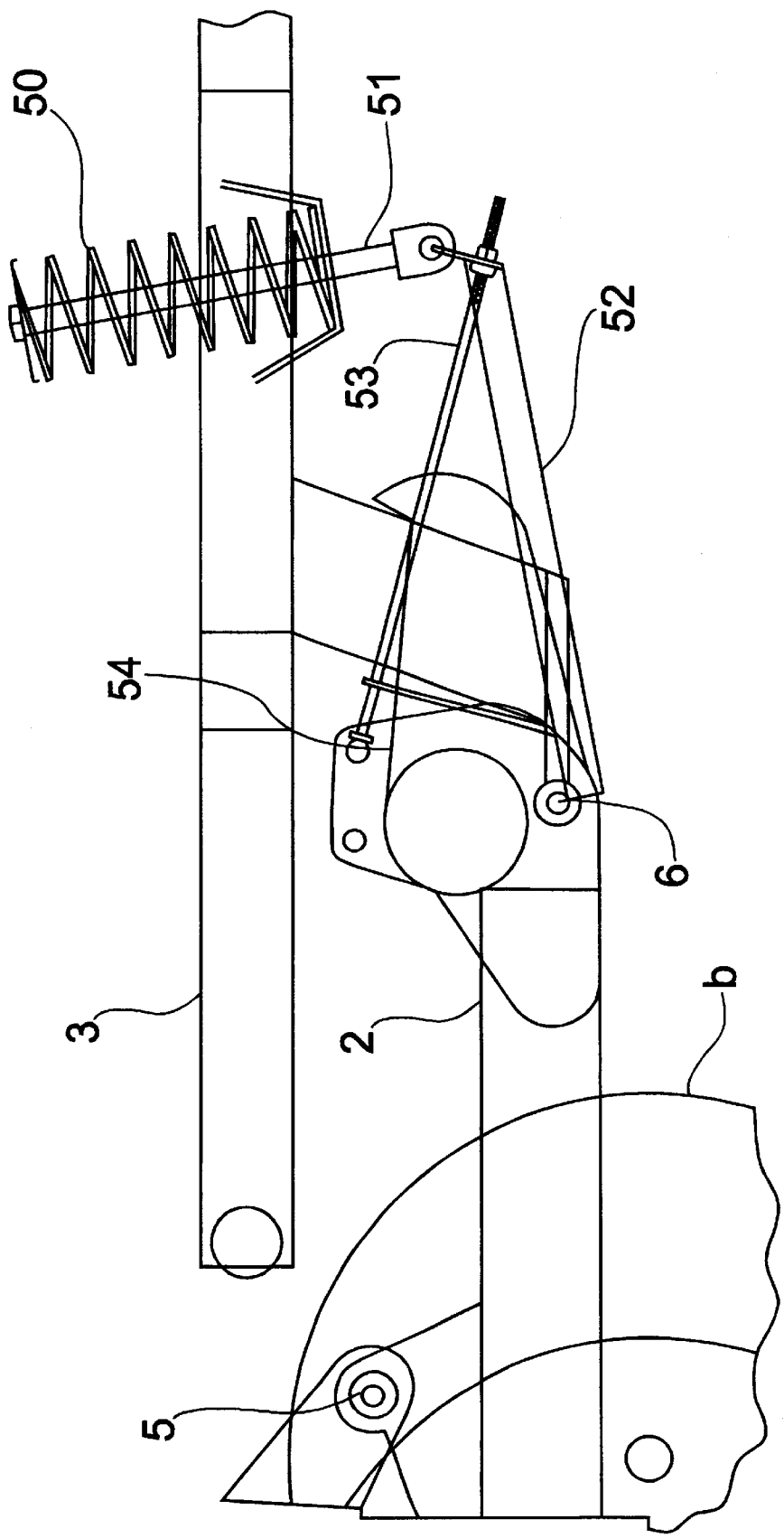
FIG. 16 is an enlarged schematic detail elevational view of the preferred embodiment corresponding to FIG. 1 to show a spring pressure transfer of weight.
Figure 17:
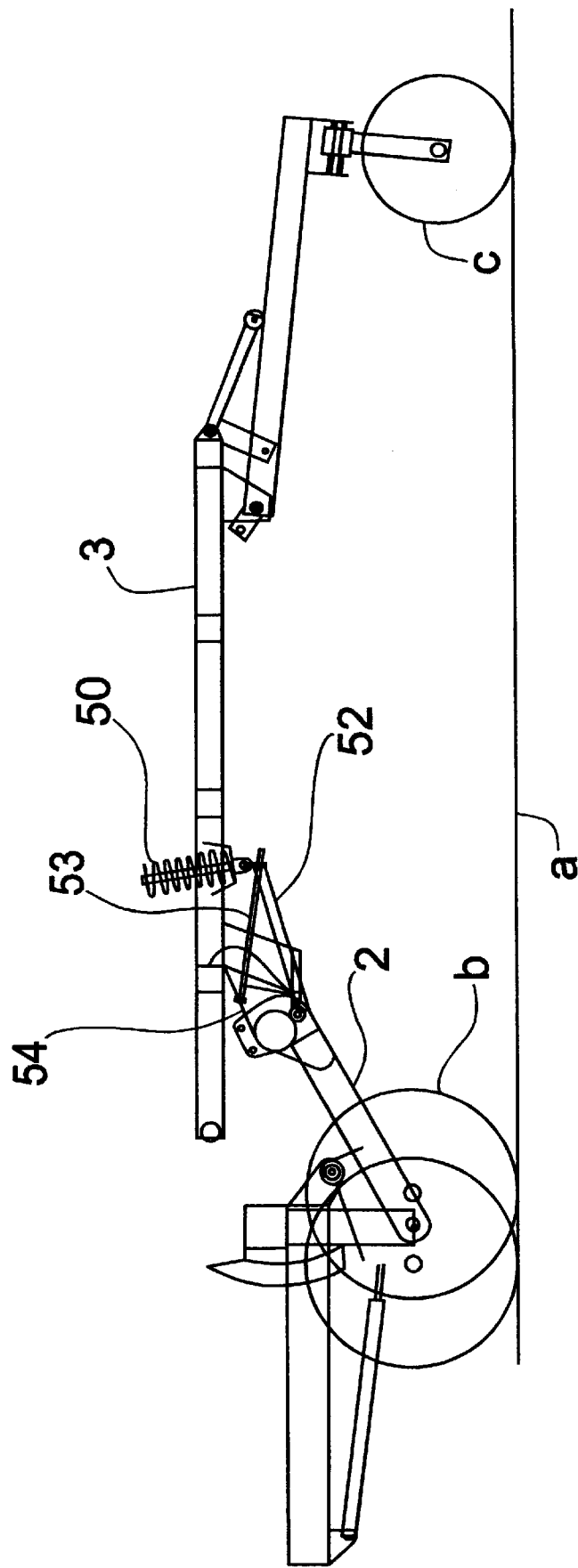
FIG. 17 is similar to FIG. 2 and shows the spring pressure mechanism out of contact with the rockshaft.

Referring now to FIGS. 16 and 17, it is shown that the preferred embodiment may include a spring pressure mechanism to transfer weight to the tool gang frame 3. In FIGS. 16 and 17, the spring 50 may be pre-compressed by selectively shortening the available stroke of rod 51, such as by a nut and tread on rod 50. This provides of a large unsprung range of rotation between the first and second positions while providing the operator with additional adjustments.

In particular, as shown in FIG. 16, the tool gang frame 3 is depicted in its first position, the lowermost position, as viewed in FIG. 1. Spring 50 acts between frame 3 and rod 51 to advantageously transfer weight to the frame. The spring is adjustable by lengthening or shortening the rod 53. Arm 52 acts between rod 51 and rockshaft 2 and is pivotally attached to provide for abutment of rod 53, as at 54 in FIG. 16. In the second rockshaft position, the highest field position, rod 53 loses abutting contact as at 54 in FIG. 17 and rod 51 is fully retracted by spring 50.

As shown in FIGS. 18–20c, automatic locking is provided by means of a latching mechanism 100 including a latch hook 102 engagable with a latching member 103. An actuating mechanism 105 is operably connected to the hydraulic cylinder 99 interconnecting the frame 1 and the inner wing w1 to effect the pivotal movement of the wings w1, w2 about the vertical axes 305. The actuating mechanism 105 includes an L-shaped trip member 106 pivotally mounted by a pivot located at the vertex of the L-shaped trip member 106. The pivotal movement of the L-shaped trip member 106 is limited by opposing stops 107,108. A connecting lever 110 extends from the L-shaped trip member 106 to a pivoted latch keeper 112 operably associated with the latch hook 102. The latch keeper 112 is pivotably moveable to interfere with the latch hook 102 thereby preventing engagement between the latch hook 102 and the latching member 103.

Figure 18:
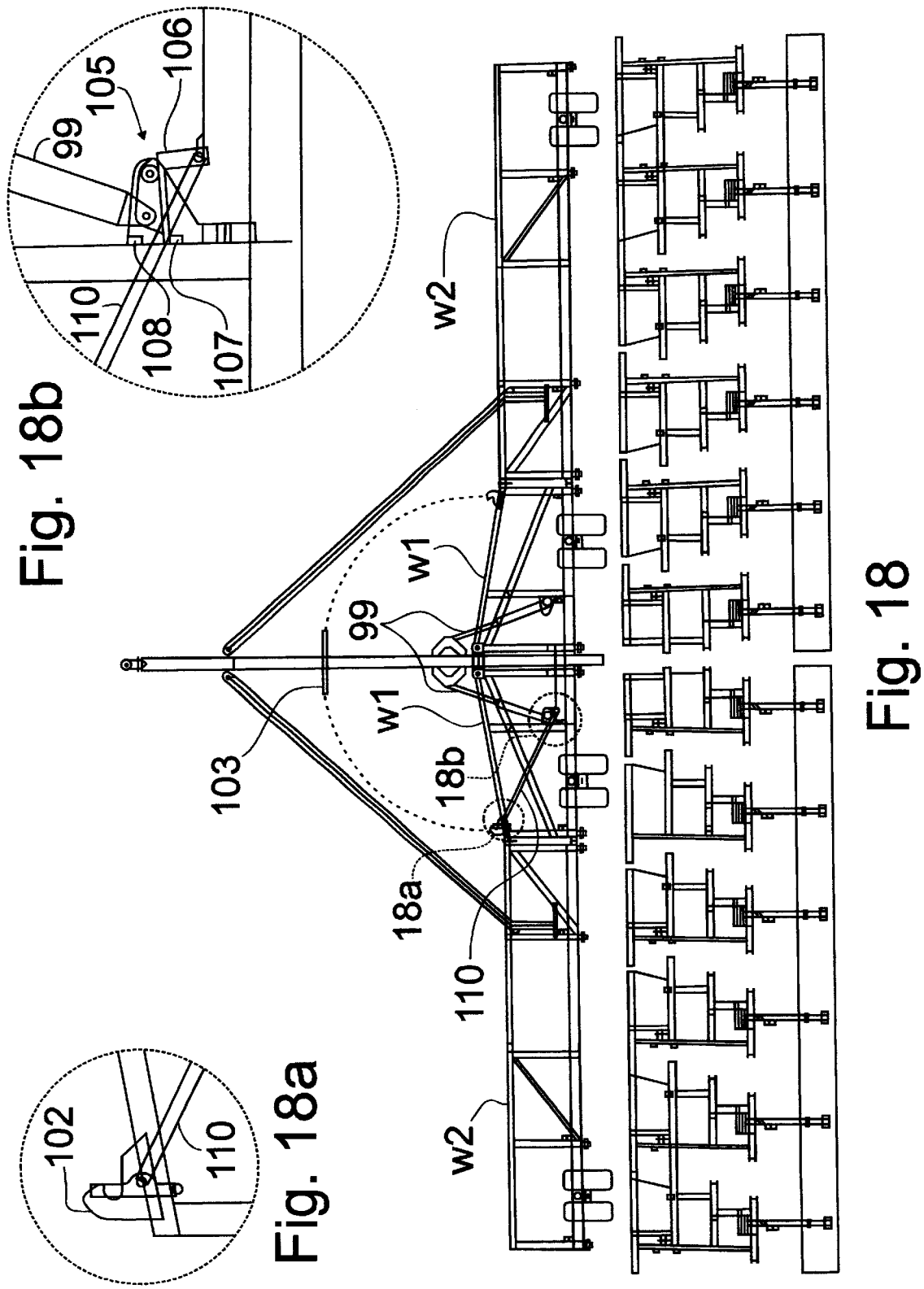
FIG. 18 is a schematic plan view of the tool gang frame showing the automatic locking devices of the preferred embodiment.
Figure 19:
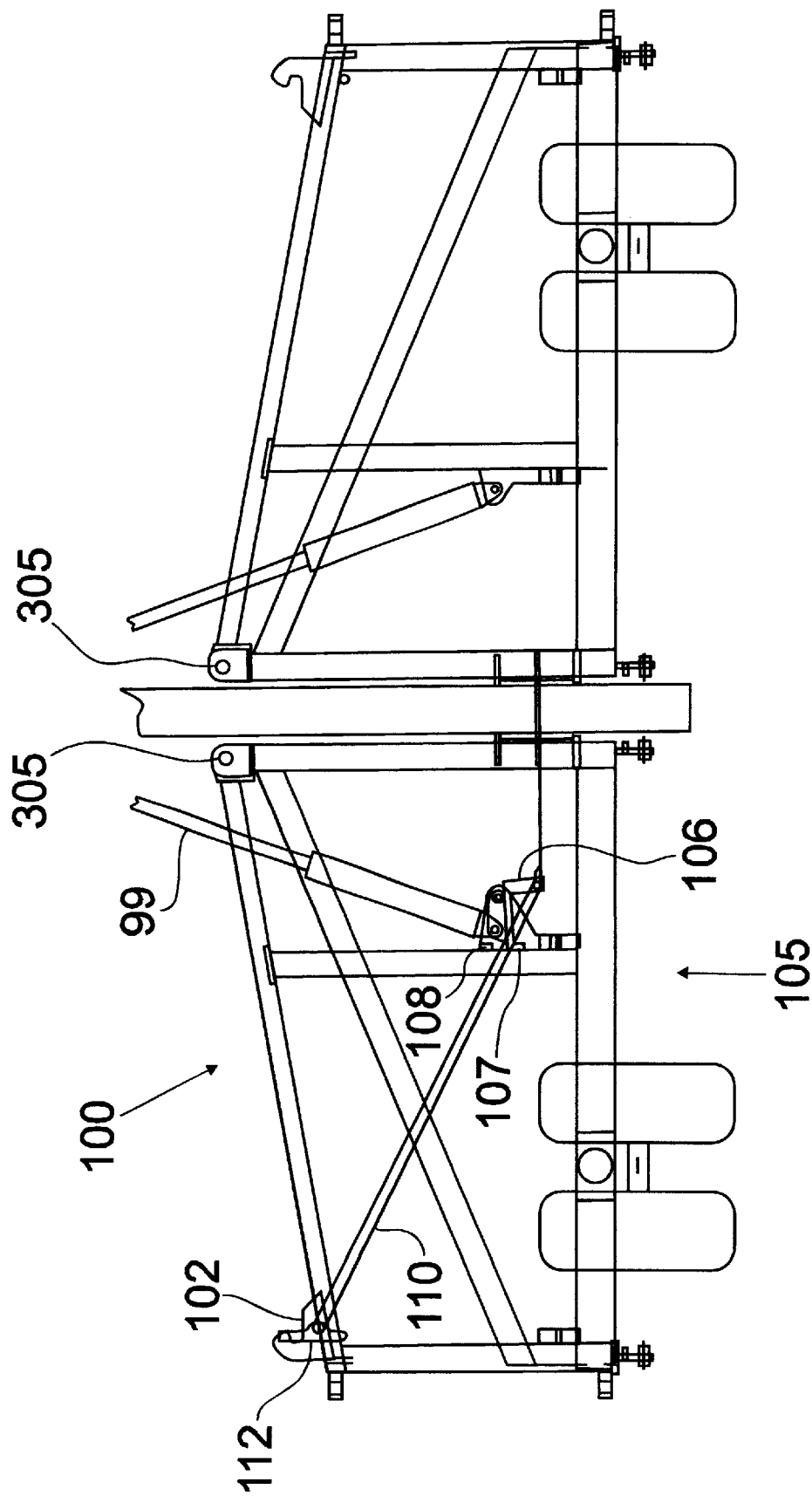
FIG. 19 is a partial schematic plan view of the central portion of the carrier frame depicting the autolock mechanism in a field operating position.
Figure 20:
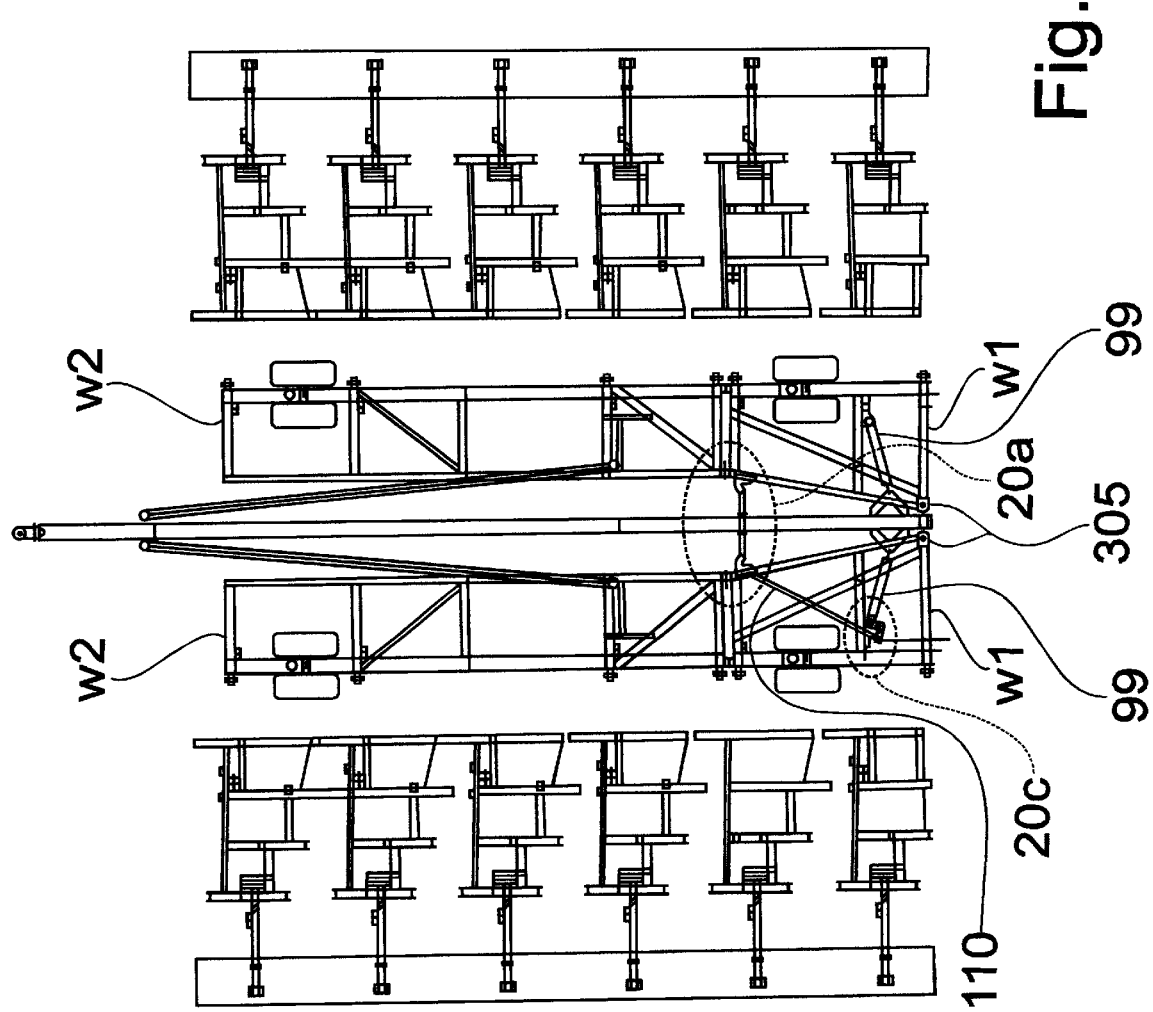
FIG. 20 is a schematic plan view of the tool gang frame folded forwardly.
Figure 20A:
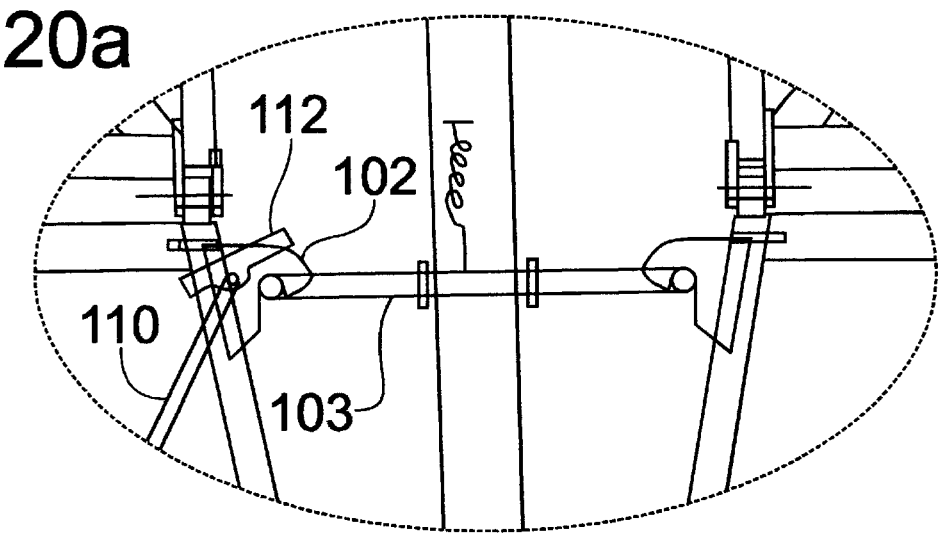
FIG. 20a is an enlarged schematic detail plan view of the first joints in the autolock mechanism similar to that of FIG. 18a positioned on the carrier frame as identified by the arrow referring to FIG. 20, but depicting the mechanism when locked in the transport position.
Figure 20B:
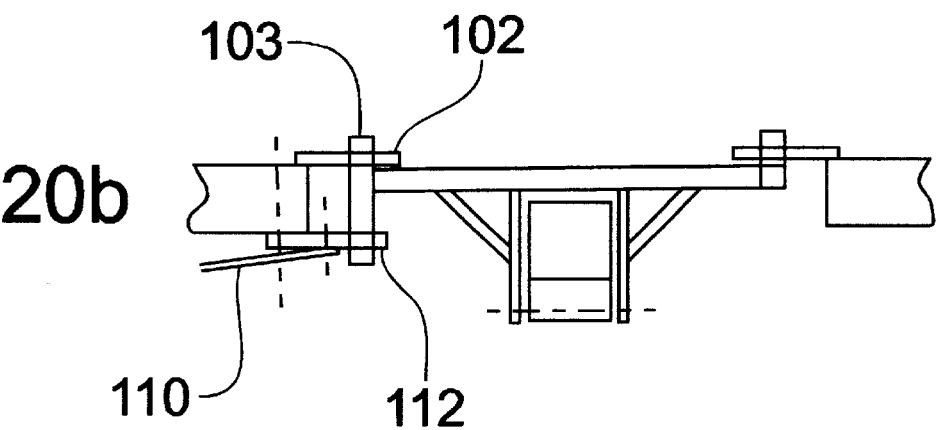
FIG. 20b is an orthogonal projection of the locked first joints of FIG. 20a depicting an elevational view thereof.
Figure 20C:
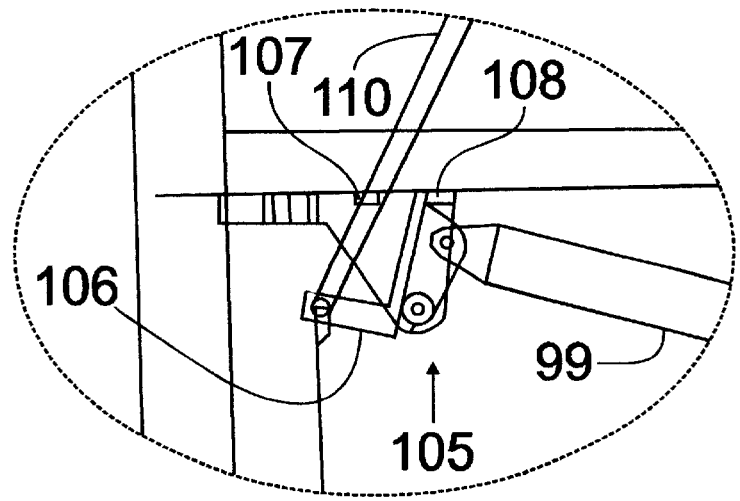
FIG. 20c is an enlarged schematic detail plan view of the second joint similar to that of FIG. 18b, but depicted in the locked transport position, as identified by the arrow referring to FIG. 20.

In operation, beginning with the implement in the field operating position as shown in FIGS. 18 and 19, the hydraulic cylinders 99 are actuated to initiate a pivotal movement of the wings w1, w2 into the transport position shown in FIG. 20. The initial collapsing of the hydraulic cylinders 99 draws the L-shaped trip member 106 forwardly against the stop 108, which in turn effects a corresponding shifting of the connecting lever 110. This movement of connecting lever 110 effects a pivotal movement of the latch keeper 112 to open the latch hook 102 and allow the latch hook 102 to receive engagement of the latching member 103. The complete collapsing of the hydraulic cylinders 99 to move the wings w1, w2 into the transport position engages the latch hook 102 with the latching member 103, thereby automatically locking the implement into the transport position.

To convert the implement from the transport position to the field operating position, the operator actuates the hydraulic cylinders 99 to cause the cylinders to extend. The initial movement of the hydraulic cylinders 99 moves the L-shaped trip member 106 rearwardly against the stop 107, thereby causing a corresponding of the connecting lever 110 to pivot the latch keeper 112. The movement of the latch keeper 112 pushes against the latching member 103 forcing a pivotal movement of the spring-loaded latching member 103 rearwardly to disengage the latching member 103 from the latch hook 102. Further extension of the hydraulic cylinders 99 is free to pivotally move the wings w1 and w2 completely into the field operating position.

Figure 21:
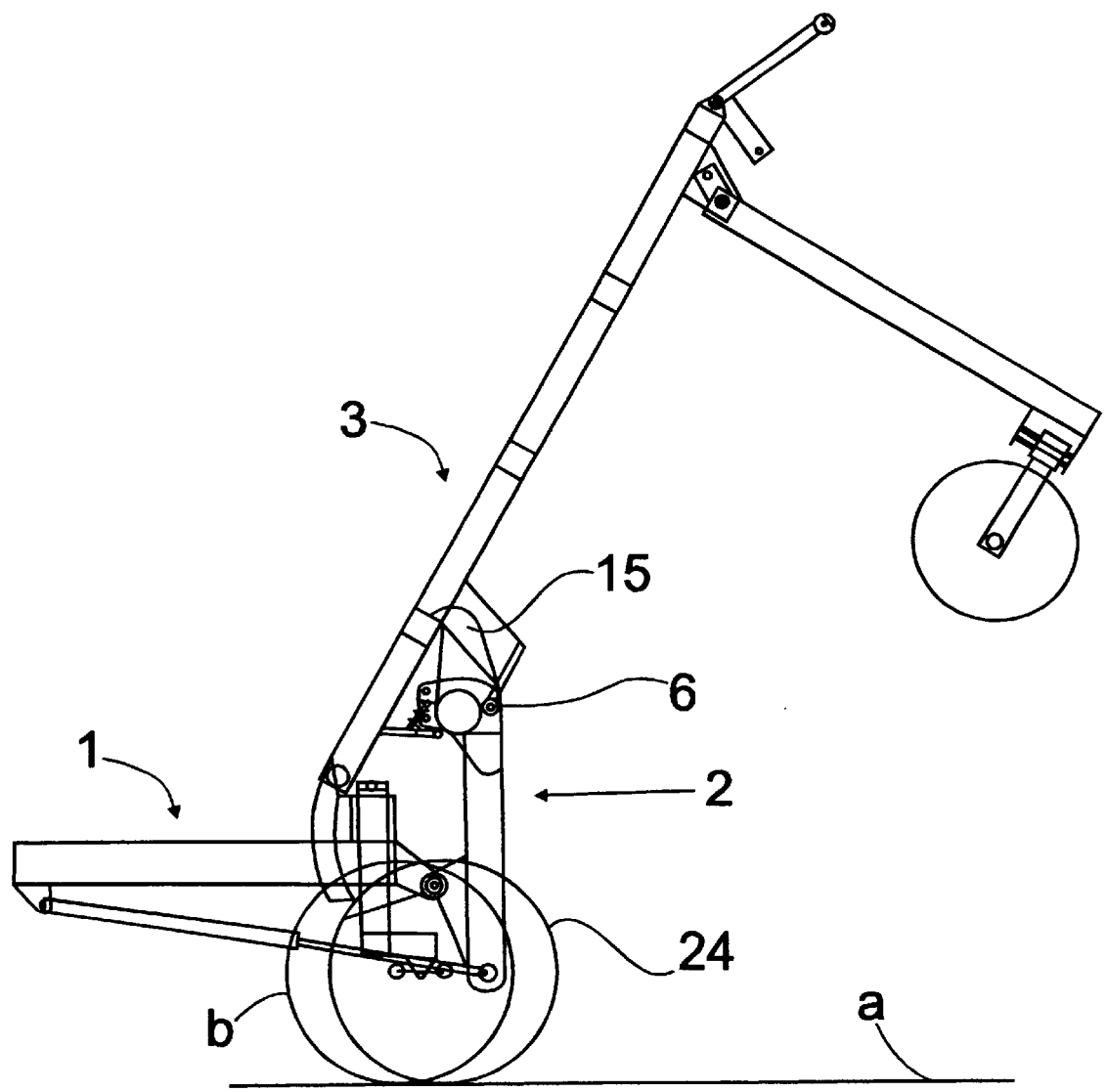
FIGS. 21 and 22 show the implement in the position shown in FIG. 3 including more detail of the caster wheel lock in the elevational view of FIG. 21 and in the rear elevational view of FIG. 22.
Figure 22:
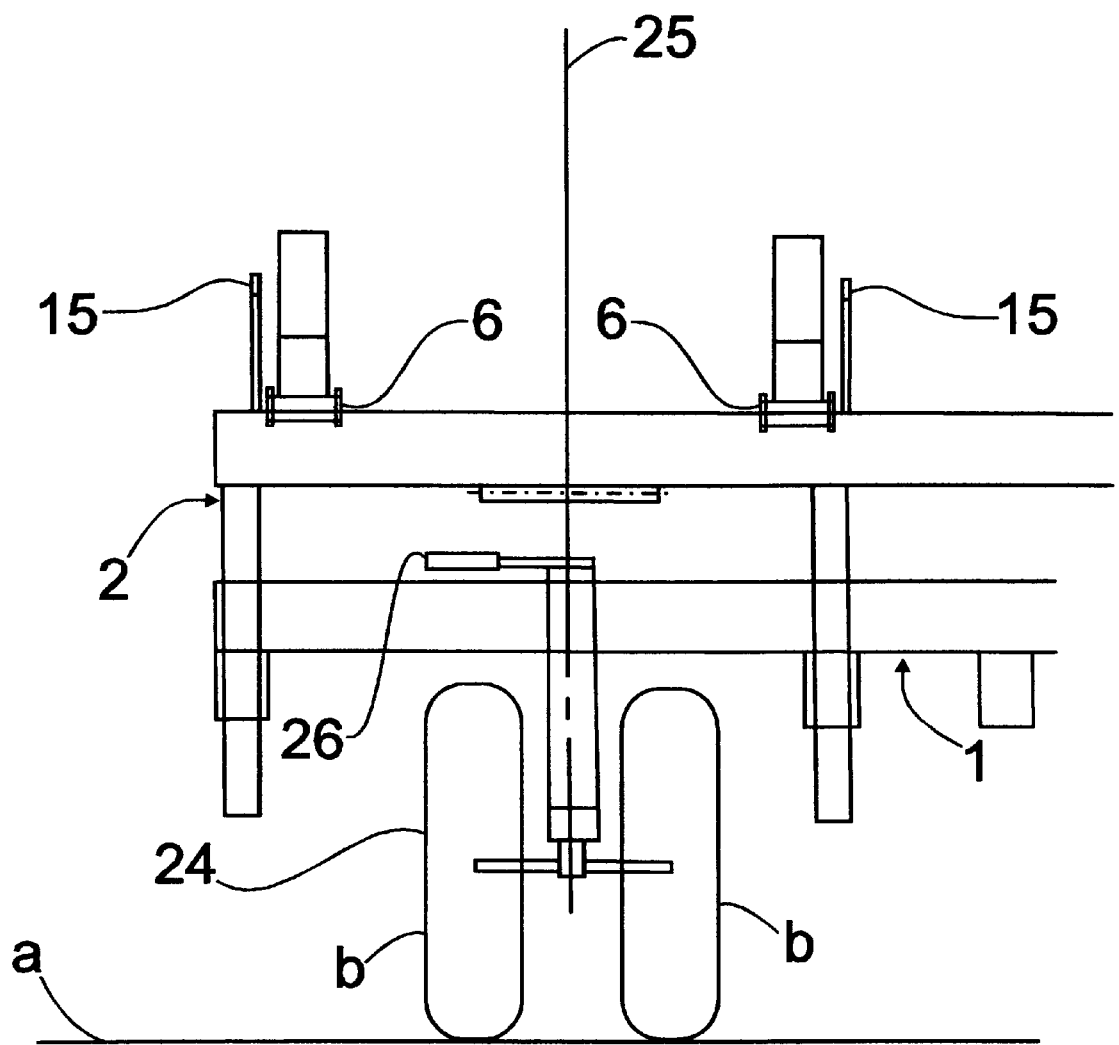

FIG. 21 shows the implement in the position shown in FIG. 3, and FIG. 22 shows wheels b as item 24 for castering about a vertical axis at 25 with extending arm 26 in the field working position. Item f is referred to as 15 in FIGS. 21–23b.

Figure 23:
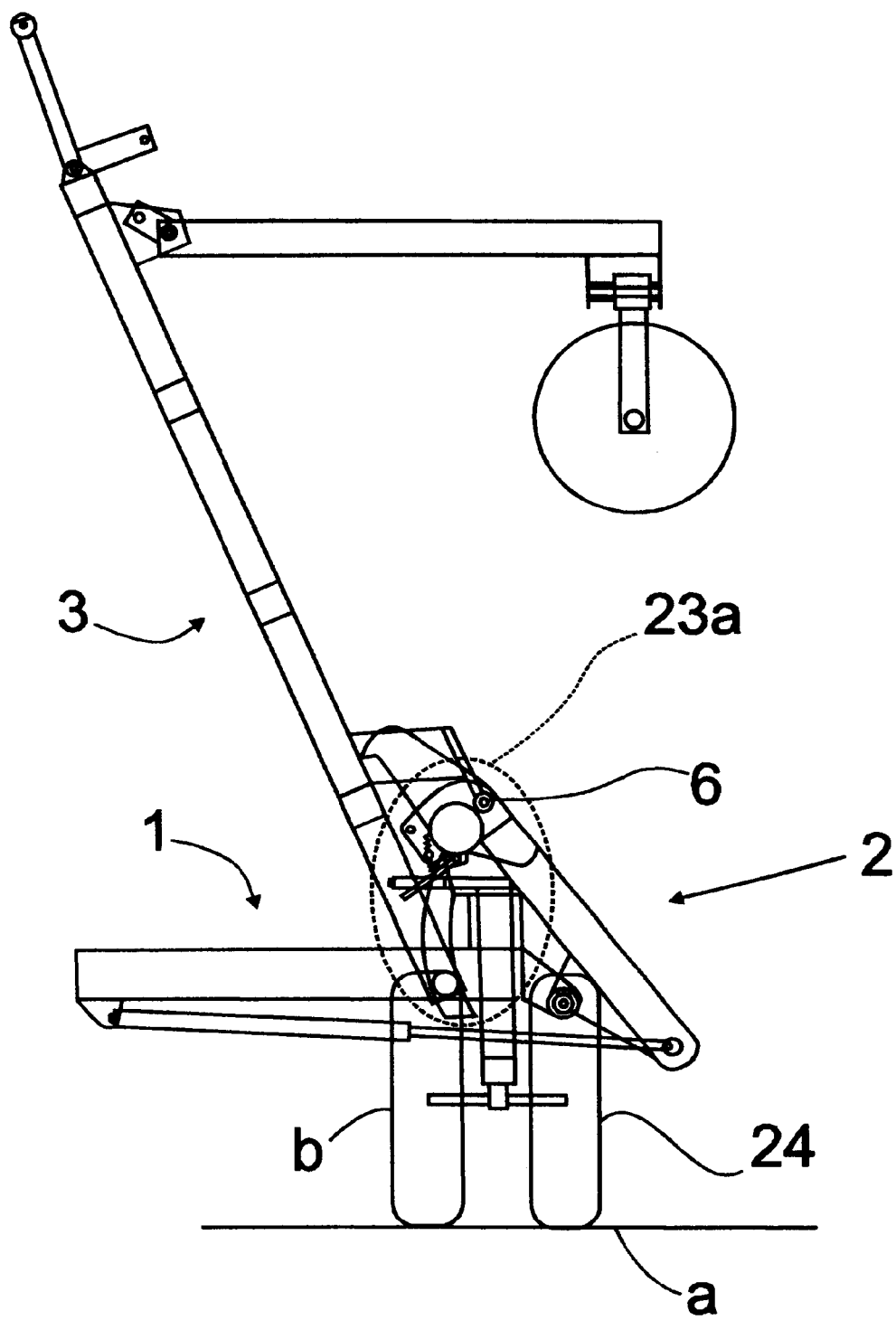
FIG. 23 shows the implement in the position depicted in FIG. 4 with the wheels fully castered into the transportation position.

FIG. 23, and in more detail in FIG. 23a, the transport condition with wheels 24 fully castered about axis 25 and arm 26 locked in position by plate 27 is shown. FIG. 23b shows the arm 26 in recess in plate 27.

Figure 24:
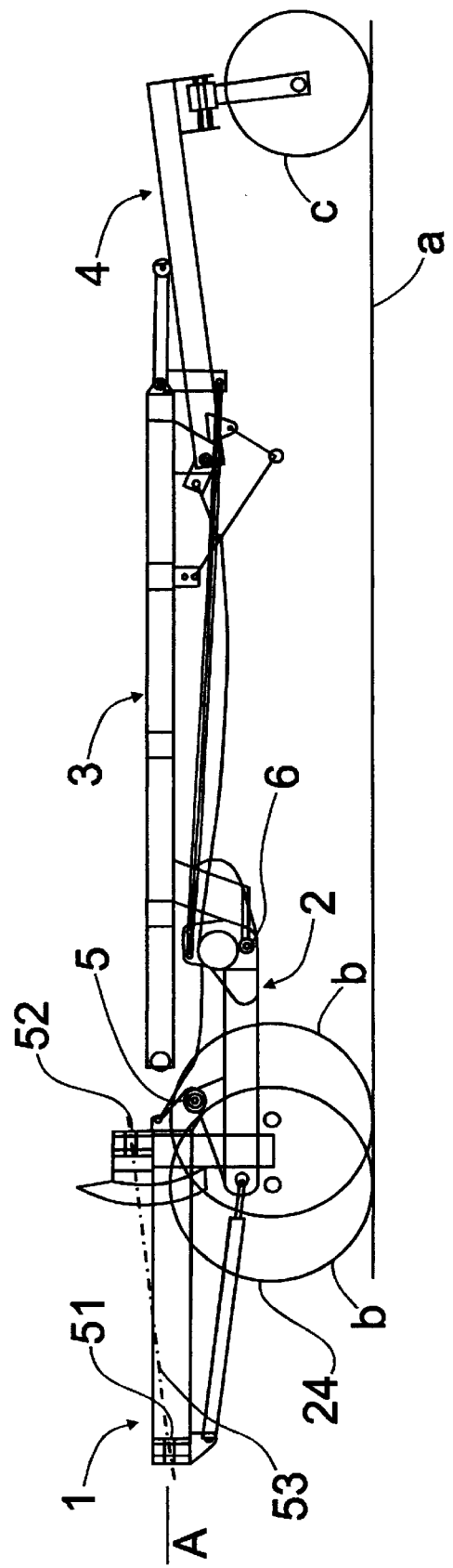
FIG. 24 is a schematic side elevational view similar to FIG. 1 but additionally showing the angled wing axis.
Figure 24A:
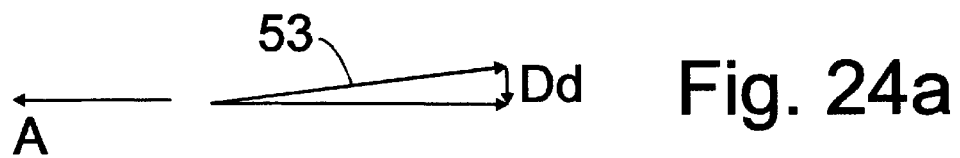
FIG. 24a shows diagrammatically the angled wing axis angle of inclination.
Figure 24B:
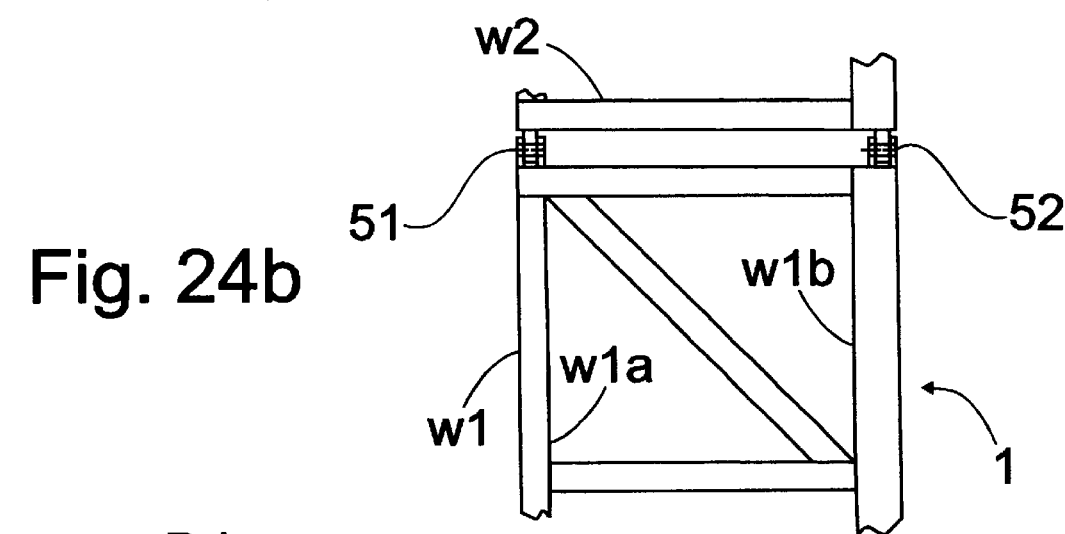
FIGS. 24b and 24c show a partial schematic plan view and a partial elevation of the joint between the inner and outer wings in the field working position.
Figure 24C:
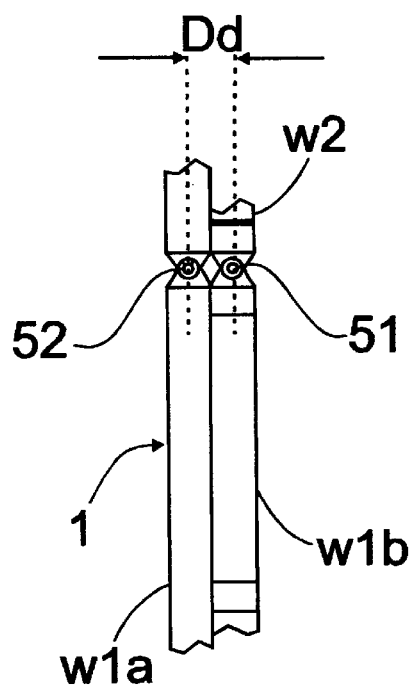

FIG. 24 shows the implement in the position of FIG. 1. Outer wing section w2 is pivotally joined to inner wing section w1 at forward and rearward points 51 and 52 respectively. In FIG. 24a, angled wing axis 53 is depicted as inclined downward and forward in the direction of travel A by amount Dd. FIG. 24b shows a partial plan view of inner wing section w1 and outer wing section w2 along with forward and rearward members w1a and w1b of inner wing w1. FIG. 24c shows a partial rear elevation of FIG. 24b.

Having thus described the invention, what is claimed is:

1. A farm implement comprising:
   a primary frame adapted for movement across a field and including a hitch member for connection to a prime mover;
   a pair of wings members pivotally connected to said primary frame for movement about respective vertical pivot axes, said wing members being disposed on opposing sides of said primary frame and movable between a transversely oriented field operating configuration and a longitudinally oriented transport configuration;
   at least one hydraulic cylinder operatively interconnecting said primary frame and said wing members to effect movement of said wing members between said field operating configuration and said transport configuration;
   a latching mechanism associated with each said wing member to lock said wing members in said transport configuration, each said latch mechanism including a latch hook mounted on the corresponding said wing member to be engagable with a spring-loaded latching member carried by said primary frame; and
   an automatic locking mechanism associated with at least one of said latching mechanisms to effect a release of said latching member when said at least one hydraulic cylinder is actuated to convert said wing members from said transport configuration to said field operating configuration, said automatic locking mechanism including:

a trip member pivotally mounted on a corresponding said wing member and connected to said at least one hydraulic cylinder to be pivotally movable upon an initial actuation of said at least one hydraulic cylinder to change the configuration of said wing members;

a latch keeper mounted on said corresponding said wing member adjacent said latch hook and being pivotally movable between an interfering position to close said latch hook so as to prevent engagement thereof with said latching member and a non-interfering position in which said latch hook is open to engage said latching member; and a connecting link extending between said trip member and said latch keeper to transfer pivotal motion from said trip member to said latch keeper.

2. The farm implement of claim 1, wherein said trip member is restricted in pivotal movement by first and second opposing stops.

3. The farm implement of claim 2, wherein said trip member is movable from said first stop against said second stop when said at least one hydraulic cylinder is initially actuated to convert said wing members from said field operating configuration to said transport configuration, the pivotal movement of said trip member against said second stop moving said latch keeper to said non-interfering position, thereby permitting said wing members to lock into said transport position through the engagement of said latch hook and said latching member.

4. The farm implement of claim 3, wherein said trip member is movable from said second stop against said first stop when said at least one hydraulic cylinder is initially actuated to convert said wing members from said transport configuration to said field operating configuration, the pivotal movement of said trip member against said first stop moving said latch keeper to said interfering position, thereby forcing said spring-loaded latching member to disengage from said latch hook and allow said wing members to be converted to said field operating configuration.

5. The farm implement of claim 4, wherein said trip member has an L-shaped configuration with a pivotal connection at a vertex thereof.

6. The farm implement of claim 5, wherein said automatic locking mechanism is mounted on only one of said wing members.

7. In a farm implement having a primary frame adapted for movement across a field; a pair of wing members pivotally connected to said primary frame for movement about respective vertical pivot axes, said wing members being disposed on opposing sides of said primary frame and movable between a transversely oriented field operating configuration and a longitudinally oriented transport configuration; at least one hydraulic cylinder operatively interconnecting said primary frame and said wing members to effect movement of said wing members between said field operating configuration and said transport configuration; a latching mechanism associated with each said wing member to lock said wing members in said transport configuration, the improvement comprising:

each said latch mechanism including a latch hook mounted on the corresponding said wing member to be engagable with a spring-loaded latching member carried by said primary frame; and an automatic locking mechanism associated with at least one of said latching mechanisms to effect a release of said latching member in response to said at least one hydraulic cylinder being actuated to convert said wing members from said transport configuration to said field operating configuration.

8. The farm implement of claim 7, wherein said automatic latching mechanism comprises:

a trip member pivotally mounted on a corresponding said wing member and connected to said at least one hydraulic cylinder to be pivotally movable upon an initial actuation of said at least one hydraulic cylinder to change the configuration of said wing members;

first and second stops mounted on said corresponding wing member to be engagable with said trip member;

a latch keeper mounted on said corresponding said wing member adjacent said latch hook and being pivotally movable between an interfering position to close said latch hook so as to prevent engagement thereof with said latching member and a non-interfering position in which said latch hook is open to engage said latching member; and a connecting link extending between said trip member and said latch keeper to transfer pivotal motion from said trip member to said latch keeper.

9. The farm implement of claim 8, wherein said trip member is movable from said first stop against said second stop when said at least one hydraulic cylinder is initially actuated to convert said wing members from said field operating configuration to said transport configuration, the pivotal movement of said trip member against said second stop moving said latch keeper to said non-interfering position, thereby permitting said wing members to lock into said transport position through the engagement of said latch hook and said latching member.

10. The farm implement of claim 9, wherein said trip member is movable from said second stop against said first stop when said at least one hydraulic cylinder is initially actuated to convert said wing members from said transport configuration to said field operating configuration, the pivotal movement of said trip member against said first stop moving said latch keeper to said interfering position, thereby forcing said spring-loaded latching member to disengage from said latch hook and allow said wing members to be converted to said field operating configuration.

11. A farm implement comprising:

a primary frame adapted for movement across a field and including a hitch member for connection to a prime mover;

a pair of wing members pivotally connected to said primary frame for movement about respective vertical pivot axes, said wing members being disposed on opposing sides of said primary frame and movable between a transversely oriented field operating configuration and a longitudinally oriented transport configuration;

a pair of hydraulic cylinders operatively interconnecting, respectively, said primary frame and said wing members to effect movement of said wing members between said field operating configuration and said transport configuration;

a latching mechanism associated with each said wing member to lock said wing members in said transport configuration, each said latch mechanism including a latch hook mounted on the corresponding said wing member to be engagable with a spring-loaded latching member carried by said primary frame; and an automatic locking mechanism associated with one of said latching mechanisms to effect a release of said latching members when said hydraulic cylinders are actuated to convert said wing members from said transport configuration to said field operating configuration, said automatic latching mechanism including:

a trip member pivotally mounted on the corresponding said wing member and connected to the corresponding said hydraulic cylinder to be pivotally movable upon an initial actuation of said hydraulic cylinders to change the configuration of said wing members;

first and second stops mounted on said corresponding wing member to be engagable with said trip member;

a latch keeper mounted on said corresponding said wing member adjacent the corresponding said latch hook and being pivotally movable between an interfering position to close said corresponding latch hook so as to prevent engagement thereof with said latching member and a non-interfering position in which said corresponding latch hook is open to engage said latching member; and a connecting link extending between said trip member and said latch keeper to transfer pivotal motion from said trip member to said latch keeper.

12. The farm implement of claim 11, wherein said trip member is movable from said first stop against said second stop when said hydraulic cylinders are initially actuated to convert said wing members from said field operating configuration to said transport configuration, the pivotal movement of said trip member against said second stop moving said latch keeper to said non-interfering position, thereby permitting said wing members to lock into said transport position through the engagement of said latch hooks and said latching member.

13. The farm implement of claim 11, wherein said trip member is movable from said second stop against said first stop when said hydraulic cylinders are initially actuated to convert said wing members from said transport configuration to said field operating configuration, the pivotal movement of said trip member against said first stop moving the corresponding said latch keeper to said interfering position, thereby forcing said spring-loaded latching member to disengage from said latch hook and allow said wing members to be converted to said field operating configuration.

* * * * *